US 8,868,919 B2

(12) United States Patent
Barton et al.

(10) Patent No.: US 8,868,919 B2
(45) Date of Patent: *Oct. 21, 2014

(54) AUTHENTICATION METHOD OF FIELD CONTENTS BASED CHALLENGE AND ENUMERATED PATTERN OF FIELD POSITIONS BASED RESPONSE IN RANDOM PARTIAL DIGITIZED PATH RECOGNITION SYSTEM

(71) Applicant: Authernative, Inc., Redwood City, CA (US)

(72) Inventors: Edward M. Barton, Dublin, CA (US); Len L. Mizrah, Redwood City, CA (US)

(73) Assignee: Authernative, Inc., Redwood City, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/658,800

(22) Filed: Oct. 23, 2012

(65) Prior Publication Data

US 2014/0115670 A1    Apr. 24, 2014

(51) Int. Cl.
*G06F 21/00* (2013.01)
*G06F 21/36* (2013.01)
*H04L 9/32* (2006.01)

(52) U.S. Cl.
CPC .............. *G06F 21/36* (2013.01); *H04L 9/3226* (2013.01); *H04L 9/3228* (2013.01)
USPC ................ 713/182; 713/183; 713/184; 726/5

(58) Field of Classification Search
CPC .............................. G06F 21/36; H04L 9/3226
USPC .................................. 713/182–185; 726/2–21
See application file for complete search history.

(56) References Cited

U.S. PATENT DOCUMENTS

| | | | |
|---|---|---|---|
| 5,241,599 A | 8/1993 | Bellovin et al. | |
| 5,276,314 A | 1/1994 | Martino et al. | |
| 5,425,102 A | 6/1995 | Moy | |
| 5,440,635 A | 8/1995 | Bellovin et al. | |
| 5,465,084 A | 11/1995 | Cottrell | |
| 5,559,961 A | 9/1996 | Blonder | |
| 5,742,035 A * | 4/1998 | Kohut | 235/380 |

(Continued)

OTHER PUBLICATIONS

T. Rakesh Kumar, S. V. Raghavan, "PassPattern System (PPS): A Pattern-Based User Authentication Scheme", Networking 2008 Ad Hoc and Sensor Networks, Wireless Networks, Next Generation Internet Lecture Notes in Computer Science, vol. 4982, 2008, pp. 162-169.*

(Continued)

*Primary Examiner* — Jeffery Williams
*Assistant Examiner* — Zhimei Zhu
(74) *Attorney, Agent, or Firm* — Haynes Beffel & Wolfeld LLP

(57) ABSTRACT

An interactive method for authentication is based on a shared secret which is in the form of an enumerated pattern of fields on a frame of reference. An instance of the frame of reference comprises an array of characters in which the characters are arranged in a random or other irregular pattern on a grid of content fields. An authentication challenge includes characters from the character set, and is delivered in- or out-of-band. The authentication response includes the enumerated position numbers on the enumerated pattern of the field locations on the grid at which the challenge characters are found.

44 Claims, 12 Drawing Sheets

(56) References Cited

U.S. PATENT DOCUMENTS

| | | | |
|---|---|---|---|
| 6,085,320 A | 7/2000 | Kaliski | |
| 6,189,098 B1 | 2/2001 | Kaliski | |
| 6,209,104 B1 | 3/2001 | Jalili | |
| 6,226,383 B1 | 5/2001 | Jablon | |
| 6,246,769 B1* | 6/2001 | Kohut | 380/45 |
| 6,332,192 B1 | 12/2001 | Boroditsky et al. | |
| 6,792,533 B2 | 9/2004 | Jablon | |
| 6,829,356 B1 | 12/2004 | Ford | |
| 6,934,860 B1* | 8/2005 | Goldstein | 713/183 |
| 6,959,394 B1 | 10/2005 | Brickell et al. | |
| 7,010,692 B2 | 3/2006 | Jablon | |
| 7,073,067 B2 | 7/2006 | Mizrah | |
| 7,139,917 B2 | 11/2006 | Jablon | |
| 7,188,314 B2* | 3/2007 | Mizrah | 715/741 |
| 7,359,507 B2 | 4/2008 | Kaliski | |
| 7,392,388 B2* | 6/2008 | Keech | 713/170 |
| 7,409,705 B2* | 8/2008 | Ueda et al. | 726/5 |
| 7,506,161 B2 | 3/2009 | Mizrah | |
| 7,577,987 B2 | 8/2009 | Mizrah | |
| 7,644,433 B2 | 1/2010 | Mizrah | |
| 7,681,228 B2 | 3/2010 | Mizrah | |
| 7,716,484 B1 | 5/2010 | Kaliski | |
| 7,725,730 B2 | 5/2010 | Juels et al. | |
| 7,849,321 B2 | 12/2010 | Mizrah | |
| 7,992,005 B2* | 8/2011 | Torres et al. | 713/182 |
| 8,006,300 B2* | 8/2011 | Mizrah | 726/20 |
| 8,041,954 B2* | 10/2011 | Plesman | 713/183 |
| 8,140,854 B2* | 3/2012 | Ogawa | 713/183 |
| 8,191,126 B2* | 5/2012 | Raghavan | 726/7 |
| 2004/0119746 A1 | 6/2004 | Mizrah | |
| 2004/0123160 A1 | 6/2004 | Mizrah | |
| 2004/0225899 A1* | 11/2004 | Mizrah | 713/202 |
| 2008/0072045 A1* | 3/2008 | Mizrah | 713/171 |
| 2011/0197070 A1* | 8/2011 | Mizrah | 713/176 |
| 2012/0166791 A1 | 6/2012 | Barton et al. | |
| 2012/0166809 A1 | 6/2012 | Barton et al. | |
| 2014/0115679 A1* | 4/2014 | Barton et al. | 726/7 |

OTHER PUBLICATIONS

Stephen Howes, A pattern for successful authentication, Computer Fraud & Security, vol. 2011, Issue 10, Oct. 2011, pp. 13-15.*

Jhawar, R.; Inglesant, P.; Courtois, N.; Sasse, M.A, "Make mine a quadruple: Strengthening the security of graphical one-time PIN authentication," 2011 5th International Conference on Network and System Security (NSS), pp. 81-88, Sep. 6-8, 2011.*

Mike Bond, Comments on Gridsure Authentication, Mar. 27, 2008, Retrieved from the Internet, <http://www.cl.cam.ac.uk/~mkb23/research/GridsureComments.pdf>, retrieved on Jul. 25, 2014.*

Tao, H., "Pass-Go, a New Graphical Password Scheme,"© thesis for the Master of Applied Science degree in Electrical and Computer Engineering, University of Ottawa, Jun. 2006, 110 pages.

Bolande, H.A., "Forget passwords, what about pictures?" ZDNet, Nov. 27, 2000, 2pp.

R Dhamija et al., "Deja vu: A User Study Using Images for Authentication," Proc. of the 9th USENIX Security Symp.,© Aug. 2000, 15 pp.

Haubert III, W.H. "An Interactive Approach to Secure and Memorable Passwords," A Thesis in TCC 402, School of Engineering and Applied Science, Univ. of VA, Mar. 25, 2002, 26 pp.

Jermyn, I. et al., "The Design and Analysis of Graphical Passwords," Proc. 8th USENIX Security Symp., Aug. 1999, 15pp.

Lee, J., "And the Password is . . . Waterloo," New York Times, Dec. 27, 2001, 4pp.

Lemos, R., "Passwords: The weakest Link?" CNET News.com, May 22, 2002, 4pp (http://news/com.com/2009-1001-916719.html).

K.S. McCurley, "Protecting Privacy and Information Integrity of Computerized Medical Information," Sandia National Laboratories, Mar. 11, 1996, 27 pp. (http://www.swcp.com/1mccurley/cs.sandia.gov/health/health.html).

A. Perrig et al., "Hash Visualization: a New Technique to improve Real-world Security," Computer Science Dept., Carnegie Mellon Univ., 8 pp. (http://paris.cs.berkeley.edu/%7Eperrig/projects/validation/validatio- n/pdf).

Reynolds, M. "Microsoft TechFest Signposts Software Futures," Gartner Dataquest Perspective, Gartner, Inc., 2002, 8 pp.

Perrig A., et al., "Deja vu: Using Images for User Authentication," Oct. 2000, 2 pp. (http://www.sims.berkeley.edu/dejavu).

"The Science Behind Passfaces," © Real User Corporation, Jun. 2004, 5 pp. (http://www.realuser.com/published/ScienceBehindPassfaces.pdf).

Extended European Search Report Mailed May 26, 2010 in Application No. 07114710.2, 7 pp.

Wikipedia, "Hardware security module," Oct. 2012, 4 pp. (http://en.wikipedia.org/wiki/Hardware_security_module).

* cited by examiner

ENUMERATED PATTERN HATCHED FOR EASY REFERENCE

Grid fields contain random-per-session content

| 10 | 5 | 3  | 6  | 1  | 5  | 10 | 6 | 9 | 6  |
|----|---|----|----|----|----|----|---|---|----|
| 2  | 1 | 10 | 8  | 5  | 7  | 4  | 7 | 1 | 10 |
| 5  | 3 | 5  | 4  | 1  | 9  | 3  | 2 | 4 | 3  |
| 7  | 10| 7  | 10 | 6  | 7  | 4  | 6 | 5 | 6  |
| 2  | 4 | 1  | 9  | 4  | 10 | 8  | 9 | 4 | 7  |
| 8  | 7 | 3  | 7  | 8  | 2  | 5  | 2 | 6 | 3  |
| 5  | 6 | 10 | 2  | 10 | 3  | 1  | 7 | 9 | 1  |
| 10 | 3 | 9  | 8  | 4  | 6  | 9  | 2 | 8 | 3  |
| 8  | 7 | 1  | 6  | 9  | 8  | 5  | 1 | 5 | 9  |
| 4  | 9 | 2  | 8  | 1  | 2  | 3  | 8 | 4 | 2  |

| | | | | | | | | | |
|---|---|---|---|---|---|---|---|---|---|
| 10 | 5 | 3 | 6 | 1 | 5 | 10 | 6 | 9 | 6 |
| 2 | 1 | 10 | 8 | 5 | 7 | 4 | 7 | 1 | 10 |
| 5 | 3 | 5 | 4 | 1 | 9 | 3 | 2 | 4 | 3 |
| 7 | 10 | 7 | 10 | 6 | 7 | 4 | 6 | 5 | 6 |
| 2 | 4 | 1 | 9 | 4 | 10 | 8 | 9 | 4 | 7 |
| 8 | 7 | 3 | 7 | 8 | 2 | 5 | 2 | 6 | 3 |
| 5 | 6 | 10 | 2 | 10 | 3 | 1 | 7 | 9 | 1 |
| 10 | 3 | 9 | 8 | 4 | 6 | 9 | 2 | 8 | 3 |
| 8 | 7 | 1 | 6 | 9 | 8 | 5 | 1 | 5 | 9 |
| 4 | 9 | 2 | 8 | 1 | 2 | 3 | 8 | 4 | 2 |

Enumerated Pattern hatched for easy reference

Secret Challenge hatched for easy reference

Grid fields contain random-per-session content

Fig. 4

| 10 | 5 | 3 | 6 | 1 | 5 | 10 | 6 | 9 | 6 |
|----|---|----|---|---|---|----|---|---|----|
| 2 | 1 | 10 | 8 | 5 | 7 | 4 | 7 | 1 | 10 |
| 5 | 3 | 5 | 4 | 1 | 9 | 3 | 2 | 4 | 3 |
| 7 | 10 | 7 | 10 | 6 | 7 | 4 | 6 | 5 | 6 |
| 2 | 4 | 1 | 9 | 4 | 10 | 8 | 9 | 4 | 7 |
| 8 | 7 | 3 | 7 | 8 | 2 | 5 | 2 | 6 | 3 |
| 5 | 6 | 10 | 2 | 10 | 3 | 1 | 7 | 9 | 1 |
| 10 | 3 | 9 | 8 | 4 | 6 | 9 | 2 | 8 | 3 |
| 8 | 7 | 1 | 6 | 9 | 8 | 5 | 1 | 5 | 9 |
| 4 | 9 | 2 | 8 | 1 | 2 | 3 | 8 | 4 | 2 |

Hatched fields with the same digital content (in this case, 4)

⇩

|   |   |   |   |   |   |   |   |   |   |
|---|---|---|---|---|---|---|---|---|---|
|   |   |   |   |   |   | 1 |   |   |   |
|   |   |   | 1 |   |   |   |   | 1 |   |
|   |   |   |   |   |   | 1 |   |   |   |
|   | 1 |   |   | 1 |   |   |   | 1 |   |
|   |   |   |   |   |   |   |   |   |   |
|   |   |   |   |   |   |   |   |   |   |
|   |   |   |   | 1 |   |   |   |   |   |
|   |   |   |   |   |   |   |   |   |   |
| 1 |   |   |   |   |   |   |   | 1 |   |

Mark the positions where the digital content is 4

Fig. 5

AUTHENTICATION METHOD OF FIELD CONTENTS BASED CHALLENGE AND ENUMERATED PATTERN OF FIELD POSITIONS BASED RESPONSE IN RANDOM PARTIAL DIGITIZED PATH RECOGNITION SYSTEM

RELATED APPLICATIONS

The present application is related to co-pending U.S. patent application Ser. No. 13/658,812 filed on 23 Oct. 2012, entitled AUTHENTICATION METHOD OF ENUMERATED PATTERN OF FIELD POSITIONS BASED CHALLENGE AND ENUMERATED PATTERN OF FIELD POSITIONS BASED RESPONSE THROUGH INTERACTION BETWEEN TWO CREDENTIALS IN RANDOM PARTIAL DIGITIZED PATH RECOGNITION SYSTEM, and co-pending U.S. patent application Ser. No. 13/658,815, filed on 23 Oct. 2012, entitled BACK-END MATCHING METHOD SUPPORTING FRONT-END KNOWLEDGE-BASED PROBABILISTIC AUTHENTICATION SYSTEMS FOR ENHANCED CREDENTIAL SECURITY, both of which have the same inventors, and both of which are incorporated by reference as if fully set forth herein.

BACKGROUND

1. Field of the Invention

The invention relates generally to computer security, and systems that store and authenticate user-based credentials. In particular, the invention relates to improving the front end security of in- and out-of-band authentication algorithms.

2. Description of Related Art

The problem with passwords: passwords are static user credentials. This is a fundamental weakness in the secret. Even if a strong password is chosen by a user, it's long with alpha-numeric and special characters, it can still be stolen by an attacker by many different means including sniffing, key logging, phishing, shoulder surfing, man-in-the-middle, and many different types of malware. An additional consideration with passwords is that if network vulnerability were discovered, then all the passwords that flowed through the network during the window of exposure would have to be considered compromised.

Increasing password length and complexity (upper/lower case letters, adding alphanumeric characters and special marks, and the like) are well beyond users' comfort level to memorize such credential, which is leading to the increased cost of frequent credential reset requests. Hence, the problems with passwords cannot be solved by improving upon the password; a paradigm shift is required. The Random Partial Digitized Path Recognition (RPDPR) and the Random Partial Pattern Recognition (RPPR) algorithms—invented by Mizrah in U.S. Pat. Nos. 7,188,314 and 7,073,067, respectively—describe just such a paradigm shift. These algorithms were created to solve some of the many deficiencies of static passwords including: memorization difficulties, low security, and a number of front end attack vectors like phishing, man-in-the-browser, malware, and Trojans. To reduce memorization pressure, significantly improve ease of use, and solve many front end security flaws with static credentials like passwords, the RPDPR and RPPR technologies utilize dynamic grids of fields, and a graphical pattern of fields that is the shared secret.

To define a couple of terms to be used in this specification:

Enumerated pattern is an authentication factor term—and it is a graphical credential based on enumerated pattern of fields on a grid of fields. The enumerated pattern term can also be used to describe any number of authentication algorithms that can be applied to the graphical credential based on an enumerated pattern of fields on a grid of fields. The enumerated pattern includes an ordered, or otherwise enumerated, list of credential elements, where each element has a credential value, and where the ordered list in combination can be characterized as a pattern on the grid.

A grid is a frame of reference. Other types of frames of reference can be utilized as well. An instance of a frame of reference includes fields that have locations on the frame of reference. A data set identifying an enumerated pattern of fields on a frame of reference can include data fields identifying locations on the frame of reference and numbered positions in the enumerated pattern. Such a data set can for example include an array of data entries having addresses (byte or word boundary addresses for example) by which the numbered positions are identifiable, where the entries in the array store coordinates of the locations of the fields on the frame of reference in the enumerated pattern. In another alternative, rather than using addresses to identify numbered positions in the enumerated pattern, the entries in the array can directly store the numbers of the corresponding enumerated positions. Of course other organizations and structures for the data set can be used.

An example of an enumerated pattern based authentication credential can be understood as follows. An enumerated pattern credential is based on a visual pattern and visual pattern recognition. This type of credential is easier to remember than strong traditional passwords while still being very secure. Since an enumerated pattern credential is a visual pattern, it is best introduced with a picture (See FIG. 1). The credential is an enumerated pattern. In this example, it is in the shape of an 'L' that starts at the top and goes down and then right. A grid with empty fields, like the one in FIG. 1, would be used for the credential setup. The login grid could be populated to form an instance of the grid, using characters from a character set, arranged randomly and in a redundant manner, in the sense that the same character appears more than once on an instance of the grid. The character set can include anything from letters to numbers to symbols. See FIG. 2 for an example of using the characters 0 to 9 as the character set.

Further, using FIG. 2 as the basis of an example that is merely one way to implement the login operation for an enumerated pattern credential authentication:

To authenticate a user who has already submitted their digital identifier to the server (e.g., a fictitious user name), the server sends back to the user a 10×10 grid of fields filled with random content (with some redundancy), which is different every session. In addition, the user is challenged with certain field positions along the pattern—say, the $2^{nd}$, $4^{th}$, $5^{th}$, and $9^{th}$ positions. These positions could simply be called the challenge(s). It is important to note that sometimes the challenge can refer to the full challenge or a single challenge position. In this text, the difference is either clearly stated or it is obvious from context.

Since the response includes the characters on the grid in the enumerated pattern credential challenge positions, the user could enter the response by typing them, clicking on the appropriate field, or even clicking on a totally different field that has the same digit in it. Referencing FIG. 2, where the enumerated pattern credential is highlighted for easy reference (FIG. 1 has the explicitly enumerated pattern credential field positions):

The digital content in the enumerated pattern credential field position 2 is 7.

The digital content in the enumerated pattern credential field position 4 is 3.

The digital content in the enumerated pattern credential field position 5 is 10.

The digital content in the enumerated pattern credential field position 9 is 9.

Since the instance of the grid is different every session, the authentication response code would be different even if the next full challenge was 2, 4, 5, and 9 again. However, note that the full challenge can be also randomized, can be any number of positions, and does not have to be in ascending or descending order.

For example, the next full authentication challenge could be 10, 2, 3, 8, and 5. This allows for different levels of security, randomness, and usability that can easily be changed to suit the needs of a particular user base. The characters in the identified positions on the pattern, in this case 7, 3, 10, and 9, are sent to the server and checked.

The enumerated pattern credential in the example using FIG. 1 is a simple shape. And while even simple credential patterns have high security, it is possible to create shapes that increase the security even further. Similar to the way password security is increased through parameters: more characters, requiring upper and lower case letters and numeric characters, etc.—the enumerated pattern credential can use parameters specific to enumerated patterns to increase security. These could include things like limiting the number of chosen fields in a row or column, not allowing the same field to be chosen more than once, having a break in the pattern, i.e., the pattern is not continuous, amongst others. Changing these parameters increases security by increasing the combinatorial capacity and reducing credential entropy leakage. An example of an enumerated pattern credential with a couple of break points, or discontinuities, that has much higher security than the credential in FIG. 1, is shown in FIG. 8.

The enumerated pattern credential authentication algorithm can also be used with in- and out-of-band techniques as described in Mizrah's U.S. Pat. No. 7,849,321 (a hidden, in-band secret challenge) and U.S. Pat. No. 8,006,300 (an out-of-band challenge). There are multiple ways to do this. For example, the random full challenge could be sent out of band. The instance of the grid could be sent out of band. Both of them could be sent out of band to the same, or different, devices. This solves one of the biggest problems with hard- and soft-what-you-have tokens in that if the tokens are stolen, then the factor is compromised.

Even if the hard- or soft-token is password or pin protected, this is, at best, a minor protection since the problems with passwords/pins are well known and fairly easy to circumvent. This means that traditional out-of-band factors really are what-user-has factors of authentication, which, by definition, are compromised if the user no longer has the token. An example of a simple way that the full challenge and the full response use a what-you-have authentication factor is to send the full authentication challenge out-of-band via SMS/MMS to a mobile device. This means that even if the device is stolen (or the SMS/MMS channel is pre-empted), the malicious attacker merely has access to the full challenge and the grid with the session specific random content. This is not enough to authenticate since the credential is still unknown to the attacker.

SUMMARY

A shift in paradigm for the challenge-response process using an enumerated pattern credential is described, shifting from a concrete value that a user enters on a client side that can be compromised by many different attack vectors like phishing, malware, man-in-the-browser, screen scraping, key logging and many more, to something that is intangible to an attacker on the client side. In short, the authentication response becomes something that exists on the front end solely in the user's mind even though it is based on a real credential that is secretly shared with the server side in the user credentials store.

BRIEF DESCRIPTION OF THE DRAWINGS

FIG. 2 is an example login operation grid.

FIG. 3 is an example of a credential creation grid with a specified enumerated pattern based credential as well as a secret challenge credential.

FIG. 4 is an example login operation grid using the secret challenge.

FIG. 5 is an example of how the digital content positions are separated according to a testing algorithm.

DETAILED DESCRIPTION

The present invention is a modification of, and improvement on, the enumerated pattern credential authentication front end described in the prior enumerated pattern credential systems. The new method and system is similar in many ways. The frame of reference, such as a grid, with the random digital content is the same. The enumerated pattern credential for a particular client comprises a data set including a plurality of data fields and having field contents, which data set identifies a plurality of locations having an order along an enumerated pattern on the frame of reference. The difference can be understood with reference to the login operation. The prior enumerated pattern credential systems use a position-based challenge and content-based response. This invention uses a content-based challenge and position-based response. While it may seem a minor difference, this change increases the security of the system substantially.

Figure 1:
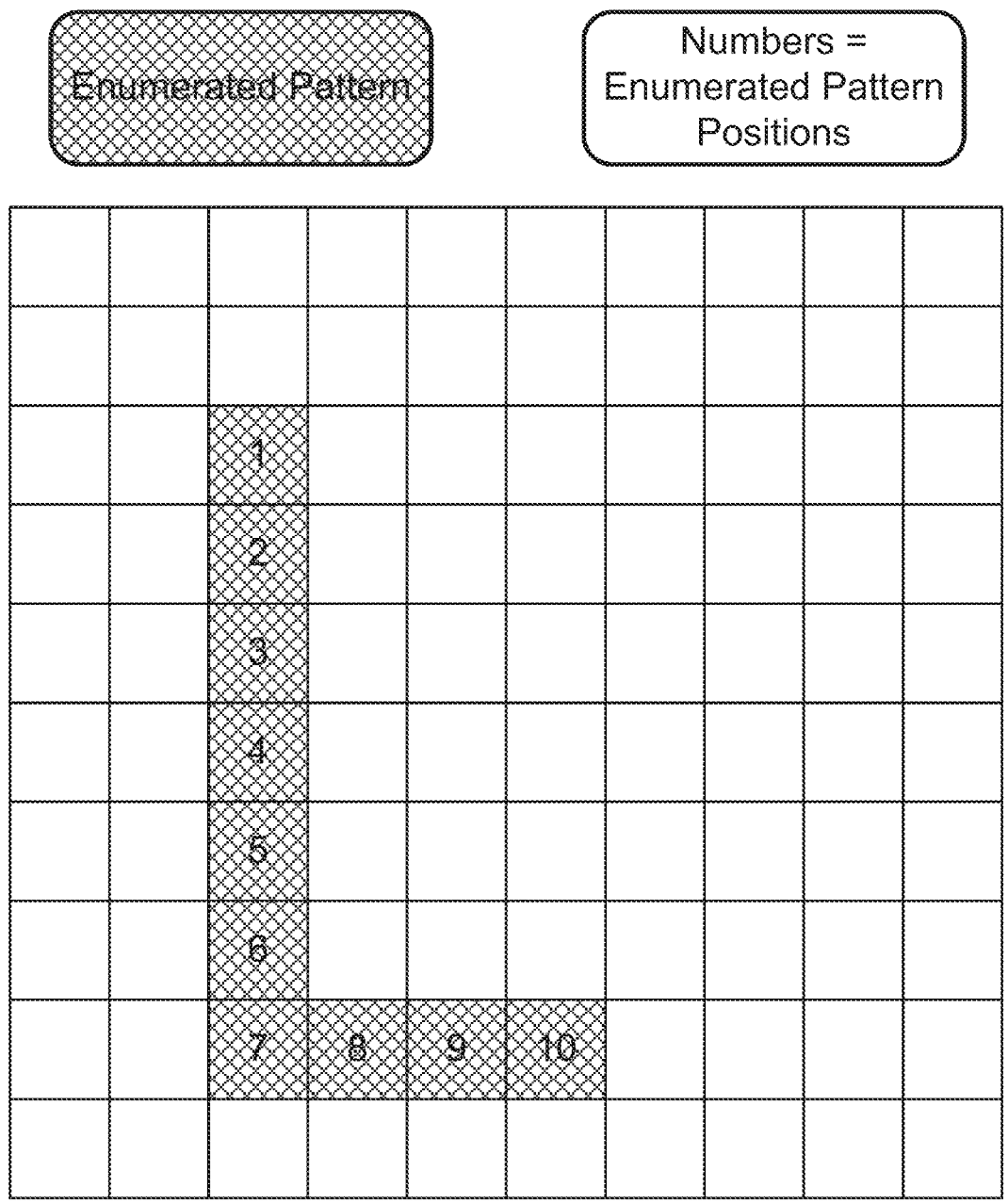
FIG. 1 is an example of a credential creation grid with a specified enumerated pattern-based credential.

Referring to FIG. 1, an enumerated pattern credential can be stored for a client in a data structure in memory, such as a secure database, which includes a set of data fields identifying locations of fields on the frame of reference having numbered positions in an enumerated pattern. The numbered positions in the enumerated pattern in the example shown in FIG. 1 can be identified by the numbers 1 to 10. The locations on the frame of reference that constitute the enumerated pattern identified by the data set could be characterized by row and column numbers, including in this example in order of position number in the pattern: row 3:column 3, row 4:column 3, row 5:column 3, row 6:column 3, row 7:column 3, row 8:column 3, row 9:column 3, row 9:column 4, row 9:column 5, and row 9:column 6. Referring to FIG. 2, a session-specific instance of the frame of reference is shown having fields filled with a session-specific content, wherein the session-specific content comprises characters that are members of a set of characters. Each of the fields on the grid in FIG. 2 has a location on the grid, which can be identified by row and column number. In other frames of reference, the locations of the fields can be identified using other coordinate systems.

In the prior enumerated pattern credential systems, a numbered position on the enumerated pattern of a location is used as a challenge, or part of a challenge, and the content on a session specific instance of the grid, in the location having that numbered position on the enumerated pattern identified by the challenge is the response. For this invention, the challenge includes a character (or a sequence of such characters) in a location having a position on the enumerated pattern in the session-specific instance of the grid, and the response identifies the numbered position (or the sequence of numbered positions) of the location on the enumerated pattern that contains the character (or of the fields having locations on the enumerated pattern that contain the characters). The number of characters in the challenge can correspond to the number of fields having locations on the enumerated pattern that are required to make a full response. The number of locations required for a full response would preferably be any non-zero subset of all the locations in the enumerated pattern. It is also possible that the number of locations required for the full response includes all of the locations. One can also use a challenge including a number of characters that is greater than the number of fields having locations on the enumerated pattern.

Authentication Method of Content-Based Challenge and Position-Based Response

To understand the difference between the invention and the prior enumerated pattern credential systems, we will revisit FIGS. 1 and 2 and go through an illustrative example of an embodiment using the content-based challenge and position-based response. Given the same enumerated pattern credential in FIG. 1 and using the instance of the grid shown in FIG. 2 for the login operation, the challenge to the user would now be a character, which can be referred to as a challenge character, which is a member of the character set (numbers 1-10). The user would traverse the enumerated pattern credential and look for the field in a location on the pattern that has the challenge character. The response would identify the numbered position in the enumerated pattern credential of the location containing the challenge character. So if, for example, given a single challenge character of 6, the single response would be position number 8 (or other identifier of the numbered position), The user would 'look' along the enumerated pattern credential until they found a location with a 6 in it, that, in this case, is the numbered position 8 of the enumerated pattern credential.

So if a given session-specific full challenge was a sequence of characters: 1, 5, 8, 10 then the responses would be:

The position in the enumerated pattern credential of a location that has the challenge character "1" in it is identified by the number 3.

The position in the enumerated pattern credential of a location that has the challenge character "5" in it is identified by the number 1.

The position in the enumerated pattern credential of a location that has the challenge character "8" in it is identified by the number 10.

The position in the enumerated pattern credential of a location that has the challenge character "10" in it is identified by the number 5.

Difference in Method of User Actions Between Prior and Current Art

Figure 7:
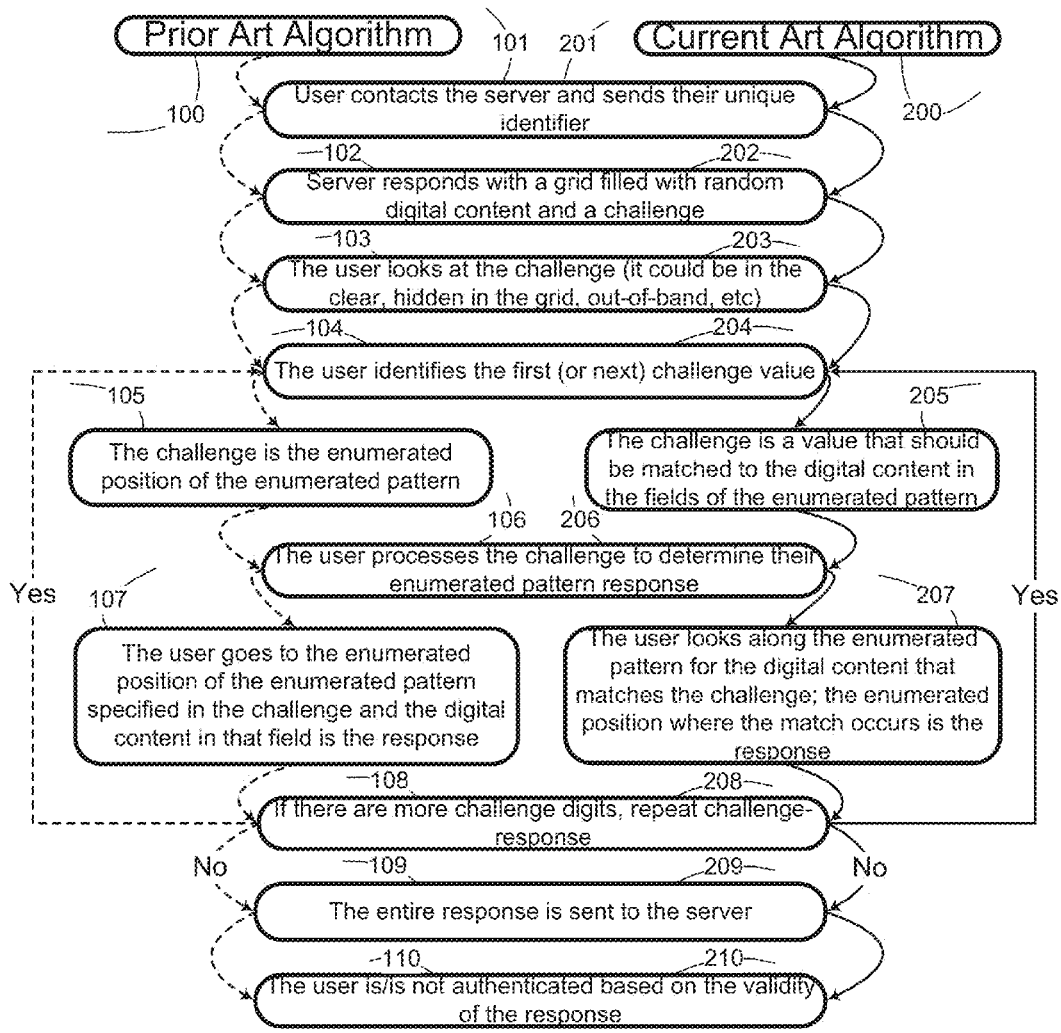
FIG. 7 is a flow chart highlighting the differences in user actions between the algorithm used in the prior enumerated pattern credential systems and the current invention.
Figure 8:
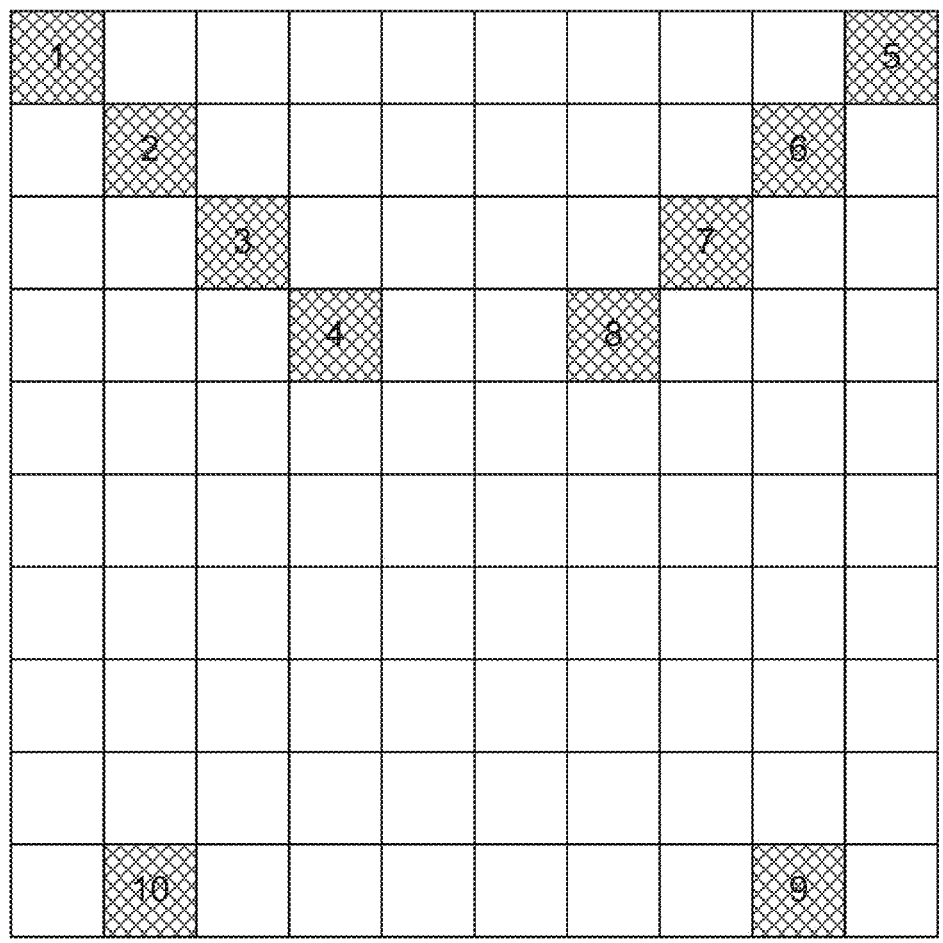
FIG. 8 is a more sophisticated example of the enumerated pattern credential (there are break points of the enumerated pattern credential continuity to enhance security and there is a symmetry element simplifying credential memorization efforts).

The algorithmic steps for an embodiment of the login operation between the two arts are quite similar. The steps that are not the same have the user performing actions that are very different in both concept and execution and therein is the novelty and inventive steps. Referencing FIG. 7, the prior enumerated pattern credential system's algorithm is identified by reference numerals in the 100's and the current invention algorithm is identified by reference numerals in the 200's. The algorithmic steps in the prior enumerated pattern credential systems 101, 102, 103, 104, 106, 108, 109 and 110 are the same algorithmic steps for this invention 201, 202, 203, 204, 206, 208, 209 and 210. The distinctions are in steps 105 and 205 and in steps 107 and 207.

Steps 104 and 204 are generic challenge steps. In both algorithms, the user is presented with a full challenge that they must use to generate a full response. While both may use a challenge, the challenge itself is different. Steps 105 and 205, respectively, describe the difference between the challenges used in the two algorithms.

Steps 105 and 205 are the challenge presented to the user. This challenge can be in the clear, hidden in the grid, sent out-of-band in some manner or many other different embodiments. For the purpose of looking at the differences in the essence of the challenge between prior and current art, the manner in which the challenge itself is presented to the user is not relevant. It is sufficient to merely state that the user has access to the challenge. Once the user registers the challenge, it must be processed. In step 105, the user sees a value for the single challenge that is the position of the enumerated credential. For example, the single challenge for step 105 could be the number 6. This denotes to the user that the response will be in the sixth position of their enumerated pattern credential. In step 205, the user also sees a value for the single challenge; however, this is a value that must be matched with the digital content in the fields of the enumerated credential. For example, the single challenge for step 205 could be 3. This value denotes to the user that they must search the fields of the enumerated pattern credential along the enumerated path of positions and find the field that has a 3 in it; the enumerated pattern credential position that has a 3 in it is the response.

Steps 106 and 206 are generic response steps. In both algorithms, the user is presented with a single challenge that they must use to generate a single response. While both may use a response generated by a challenge, the response itself is different. Steps 107 and 207, respectively, describe the difference between the responses used in two algorithms.

Steps 107 and 207 are the single response derived by the user to be sent to the server to authenticate themselves. In step 107, the user goes to the enumerated position defined in the single challenge and looks at the digital content in that position; that value, the digital content in the relevant field, is the response. For example, say the single challenge in step 105 is 6—for step 107, the user looks in the sixth enumerated credential field and it has the number 8 in it; the response is the number 8. For step 207, the user traverses the enumerated credential looking for a match of the digital content in the fields to the value defined in the single challenge. When the user finds a match, they note the enumerated position that the match occurred in. This is the response. For example, say the single challenge in step 205 is 2—for step 207 the user would look along the enumerated credential looking for the number 2 which occurs at the enumerated position of 9; the response is the number 9.

The interesting thing about the response in 207 is that, for login operation, there is no tangible thing to track on the client side. The enumerated positions for the credential are only concrete on the client side during a credential creation operation (see FIG. 1). This is one of the details that make this step novel. Even though the user processes the single challenge and single response (and the server checks it) there is nothing on the client side for an attacker to use for an attack. So the single challenge and single response method in steps 205 and 207 effectively closes down many attack vectors by shifting the paradigm of authentication of using a static value entered on the client (even if it is different per session—things like: password, prior enumerated pattern credential systems, one-time-pins, etc.) and is checked on the server to a value that, for all intents and purposes, is an intangible value on the client side that, at best case, cannot be tracked by client side software at all.

The Possible Enumerated Pattern Position Responses

The instruction set asks the user to match a value to the digital content in the fields of the grid that corresponds to the user's enumerated pattern credential. For a given single challenge there are three scenarios the user can encounter:

There are no matches in their credential to the single challenge.

There is exactly one match to the single challenge.

There are more than one matches to the single challenge.

The second case is the easiest for the user. If there is one match, then that is the response.

For the first and third cases the user can be instructed to do any number of actions.

For the first and third cases there are many ways to have the user interact with the system. The essence of the art is that the user responds in a manner that shows that they know the credential. So, for example, in the first case there could be a skip button or character that the user inputs when there is no match in their enumerated pattern to the value of the single challenge. For the third case the user could simply always use the first match in the enumerated pattern. There could be more sophisticated solutions to these problems where they never exist in the first place. For example, the randomness of the digital content in the grid can be modified so that there is always one and only one match to each challenge. This reduction on randomness may cause a slight lowering of the pure randomness in the grid and, thus, slightly lower security; however, for some customers or users the tradeoff for the increase in the user experience would be worth it.

Security Enhancements Over the in- and Out-of-Band Prior Art Methods

There is a significant, and highly beneficial, advantage to use the position as the response. When the content is used as a response, as in the prior enumerated pattern credential systems, an attacker can record the grid and response and begin to build a statistical map where, with many gathered sessions worth of data, they can uncover the enumerated pattern credential. There are many industry standard methods to make the recording of data more difficult on the wire, like TLS encryption, and they would certainly help. However, the easiest place to attack any authentication system with the intent of collecting data is to just get it from the front end client machine where the data must be in the clear. Some of the most prevalent and cheapest forms of attacks like key logging, malware, Trojans, screen scraping, man-in-the-browser, session video recording, and shoulder surfing all can easily gather the data needed to break the credential once they are present on the client machine. This can be mitigated somewhat in an enterprise by network security and managed client machines with mandatory antivirus/antimalware software, but the problem cannot be solved in any type of consumer environment where the authentication systems must accept connections from many clients that they have no way of knowing if they are being recorded or not, infected or not. Furthermore, this data can be collected even if the full challenge is hidden (say, for example, it is sent out-of-band). With the prior enumerated pattern credential systems, the attacker would not bother with the out-of-band channel because, given enough sessions, the enumerated pattern credential can be broken just with the grid data and the corresponding responses.

When the enumerated pattern credential position is used as the authentication response, there are varying levels of security improvements over the prior enumerated pattern credential systems. Starting with the lowest level of security improvement, in fact where the prior enumerated pattern credential systems and the new invention have exactly the same security, is the case where an attacker can see the challenge, the grid, and the response in the clear. For this case, there is no advantage in using a position-based response since the attacker can just map the position response to the content challenge. However, when the challenge is hidden by some means (for example, in the grid via a secret challenge described in Mizrah U.S. Pat. No. 7,849,321 or sent out-of-band as described by Mizrah in U.S. Pat. No. 8,006,300 or similar), then the level of security is better than with the prior enumerated pattern credential systems. When an attacker does not know what digital content that the position response correlates to, there is nothing that can be used to derive a statistical model since there is nothing that can be tracked. Now, to briefly examine an out-of-band example, an attacker must preempt the second channel to get the digital content challenge because without the challenge there would be nothing to track with, just a grid and a position based response. The position based response has nothing on the grid that signifies it or correlates to it in some manner. So a statistical model to determine the credential cannot be built because there is no in-band data that can be collected and used to build one.

To go into more depth on the security differences in this and the prior enumerated pattern credential systems, two different examples will be examined and analyzed—one in-band embodiment and one out-of-band embodiment.

Figure 3:
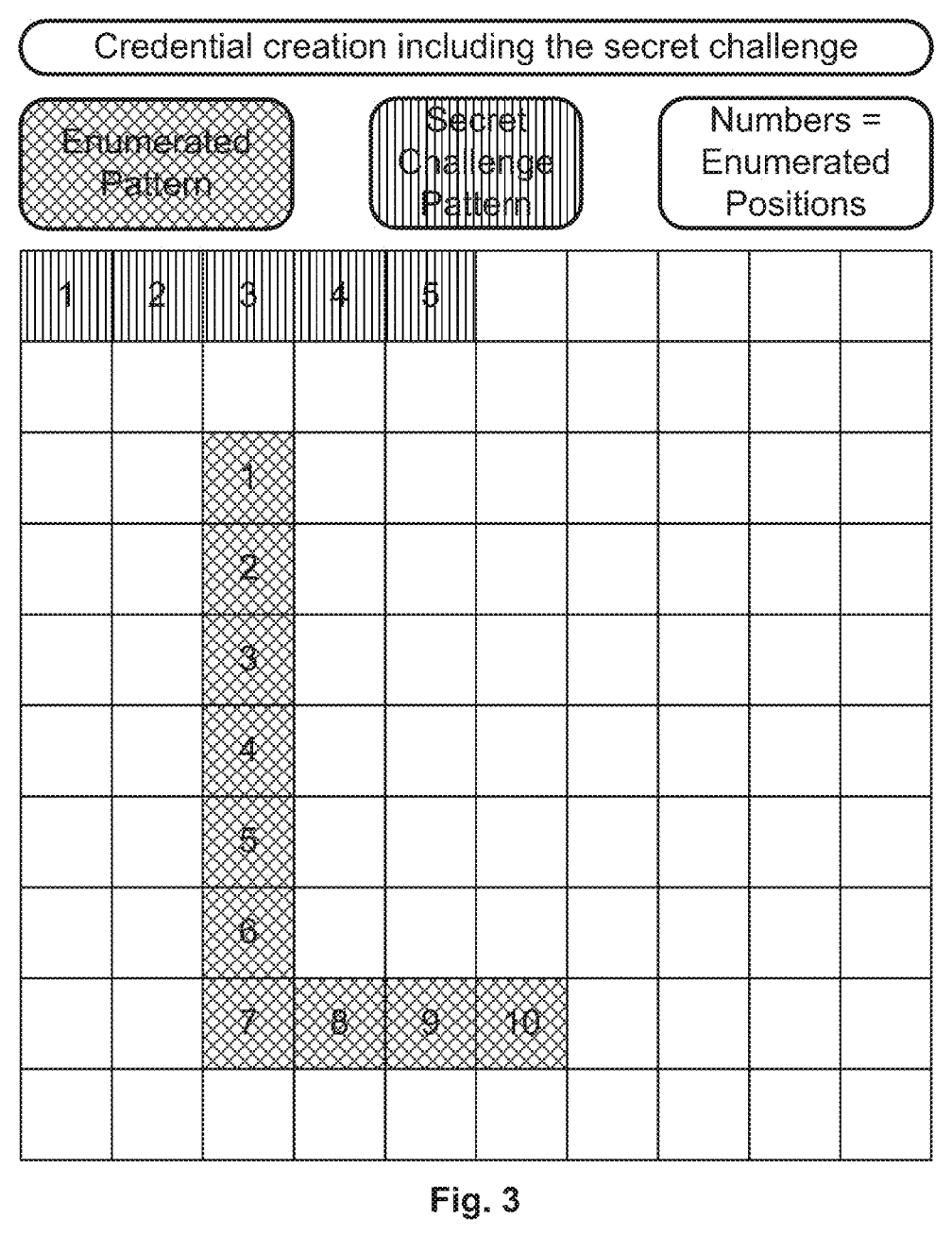

The first embodiment is an all in-band solution. Given a 10×10 grid, first a credential creation operation must be completed to set up the enumerated pattern credential on the grid (FIG. 1). There is second secret credential that is chosen on the grid as well. This is another enumerated pattern based credential that will contain the challenges for the login operation. This secret challenge path is described in Mizrah's U.S. Pat. No. 7,849,321. See FIG. 3 for an embodiment of the credential creation process for the enumerated pattern credential and the secret challenge path. In the prior enumerated pattern credential systems, the challenge path contains the challenge positions. In this invention, the challenge path contains the challenge content. Once the credential is created, then the login operation can be executed. The login operation starts with the same 10×10 grid, and it is filled with randomized digital content (see FIG. 4). In the prior enumerated pattern credential systems, the user looks for the first content value in their first secret challenge position. They then go to that position to which the first content value points in the enumerated pattern credential and enter the digital content in that field. In this invention, the user looks at the value in the first secret challenge position and matches it to the first instance of that value along the enumerated pattern credential and responds with the enumerated pattern credential position that contains the value.

The second embodiment is when the challenge is sent out-of-band. The credential creation operation is the same for both prior enumerated pattern credential systems and this invention (see FIG. 1). During the login operation the same 10×10 grid filled with random digital content is displayed to the user, say in a browser. The full challenge is sent via an out-of-band channel, like to a mobile device, to the user as well. In the prior enumerated pattern credential systems, the out-of-band challenge is a position-based challenge, and the response is the digital content in that position of the enumerated pattern credential. In this invention, the challenge is a value, and the response is the position in the enumerated pattern credential that contains that value.

The Essence of Challenge—Response Paradigm Shift in RPDPR Protocol

The difference between the prior enumerated pattern credential systems' position-based challenge and content-based response and this invention's content-based challenge and position-based response may seem, at first glance, fairly minor. However, there is a subtle but very important inventive step here; wherein the idea of a front end response is changed from something static and concrete, to something intangible that exists only in the user's mind. For things like passwords this is evident; a password is a static deterministic credential that is exactly correct, or it is wrong, and must be entered as such in the client. Even in the prior enumerated pattern credential systems, the enumerated pattern credential authentication which is probabilistic (meaning there is a many-to-one mapping of digital content to the enumerated pattern credential position), the enumerated pattern credential positions are mapped to real values on the grid as a response that must be entered by the user. Anytime a real, concrete value is entered on the client, it can be tracked, logged, and analyzed. In a position based response, the attackers are given nothing to track, effectively closing the most common attack vectors on the front end. Thus, going to an intangible response, even though the credential itself is concrete and real, it is a shift in the type of response that goes against the current paradigm of authentication systems. Given the advantages that it provides, which will be analyzed in more detail next, and the lack of prior enumerated pattern credential systems using a credential position-based response, it is a clear indication of an inventive and novel step.

Overview of Common Parameters Used in Both Prior and New Art for the Testing Methodology There is a clear advantage in using a position-based response in terms of the security of the front end as well. The enumerated pattern credential authentication in the prior art already has much better security than does password-based authentication. As such, the security of this invention will be compared against the prior enumerated pattern credential systems. Since there are many random processes in both algorithms, a program must be used to track the data. To show that the current invention has better security than the prior enumerated pattern credential systems, the testing methodology used for the creation of such a program for each will be described. The in-band, secret challenge and out-of-band examples will be analyzed and compared and contrasted.

For both cases, there are many different embodiments that can be used: the grid can be larger or smaller, the enumerated pattern credential can be longer or shorter and the full challenge can contain more or less characters. So, to be able to test with the intent to compare the conclusions, there should be a no differences between the prior enumerated pattern credential systems and this invention in the set of parameters that are common between them. A set of static sets of parameters will be chosen and will be used as assumptions for all the test cases. The parameters defining the test case's embodiments are: a 10×10 grid, an enumerated pattern credential that has 10 positions, the digital content in the grid fields are the numbers 1 to 10, ten of each one. So ten number 1's are randomly distributed throughout the grid. Ten number 2's are randomly distributed throughout the grid. Ten number 3's are randomly distributed throughout the grid, etc. The enumerated pattern credential and the secret challenge path (for the in-band case) will also be the same for the relevant test scenarios. The number of challenges will be set to five. The client will be a browser connected to an authentication server. The last assumption to be made is that an attacker can access the data in the browser including the grid and response but none of the out-of-band data. The credential set up operations happen exactly the same between the prior enumerated pattern credential systems and this invention (see FIGS. 1 and 3), so only the login operations will be analyzed.

As would be expected, those that are skilled in the art could envision many other alternative embodiments for the given algorithm that could be used. The example of using numbers could easily be changed to use letters. The character set (or the field content set) used to populate the frame of reference can consist of colors, or images, audio clips, or audiovisual bites. A characters set can be devised for the blind by using a tactile-based grid that contains brail numbers or letters. The shape of the grid and the fields in the grid need not be square. The fields could be any shape from hexagons to rectangles.

Figure 6:
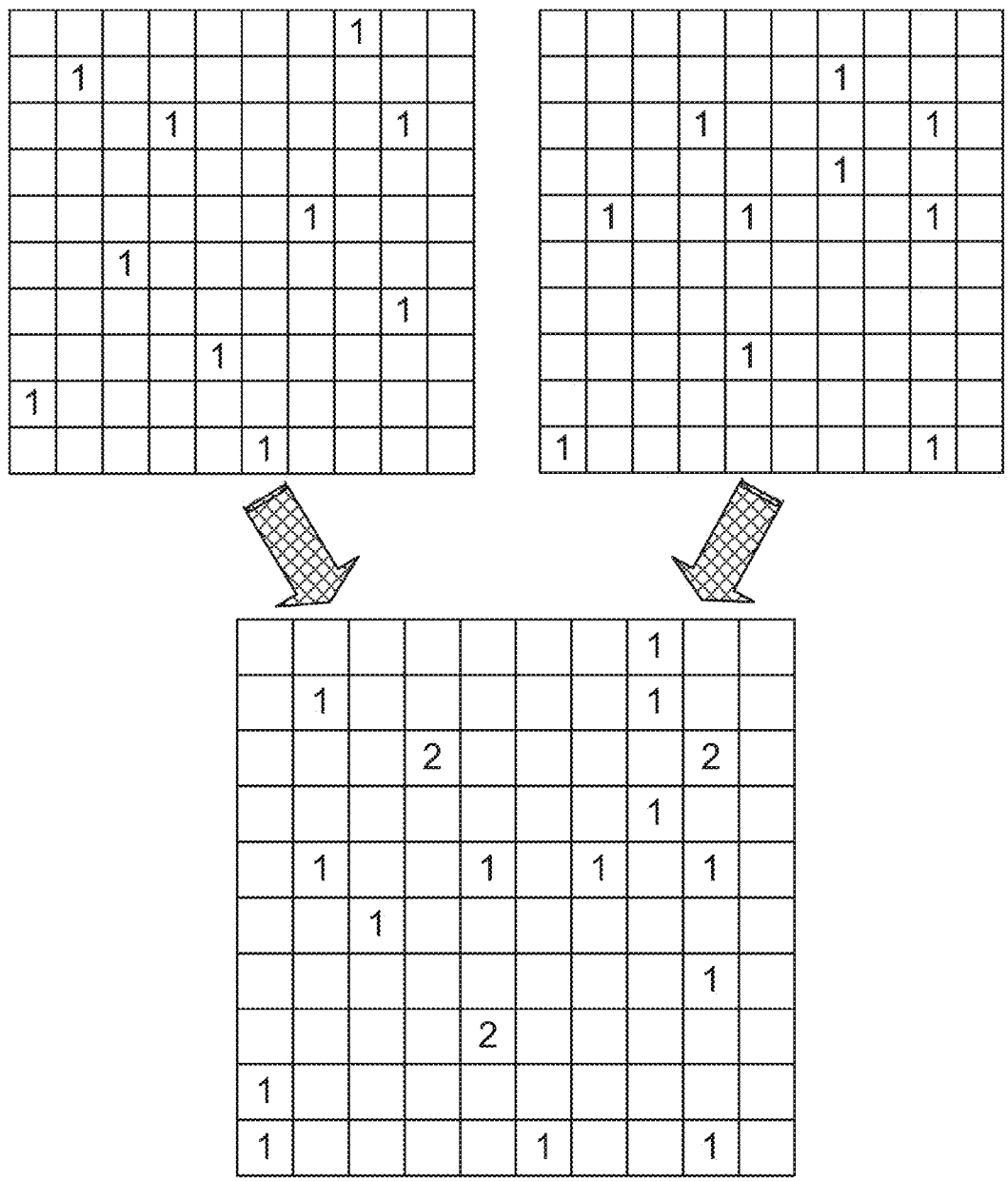
FIG. 6 is an example of how separated grids are aggregated according to a testing algorithm.

A Brief Insight into Prior and New Art Credential Reengineering Attack Algorithms First, the testing methodology for the prior enumerated pattern credential systems will be looked at since it is the same for both in- and out-of-band cases. In both cases, the full challenge is hidden, or secret. In the in-band case, the challenge is hidden in another credential on the grid. In the out-of-band case, the challenge is sent externally. For both cases, the response is the character in a particular field. This and the grid data are the only pieces of information an attacker needs to be able to crack the credential, given enough sessions. For the login operation, the grid filled with a random array of characters is sent to the browser. The character that constitutes a response is sent back. For a given response, say the character is '4', there are 10 fields in the grid that contain that character. The attacker can put a mark in those ten positions and save it (see FIG. 5). The attacker would do that for all 5 responses to the challenge positions. If all of the character responses are unique, so that five characters are included in the response, that single session would have 50 locations of the 100 locations on the grid (50%) would have a mark in them. At such a low number of total sessions nothing is leaked about the credential. However, the attacker would continue to record the login sessions. Given that the content is randomized, as session data begins to accrue, a pattern will begin to emerge (See FIG. 6 for a simple example). The locations having positions on the enumerated pattern credential (for a given set of challenges) will always be getting hits when the locations are being tracked. The rest of the locations for a given number in a field will be randomly scattered throughout the rest of the grid. So, statistically speaking, over a number of sessions, the actual enumerated pattern credential positions will have more hits than the other fields in the grid. The more sessions that are gathered, the more likely it is that the entire the enumerated pattern credential will be exposed, due to the difference in hits. At some critical mass of aggregate sessions, the enumerated pattern credential will be exposed. As a side note, the enumerated pattern credential that is chosen does have an impact on how many sessions it takes to guess. A simplistic enumerated pattern credential with no breaks is easier to spot in the data. An enumerated pattern credential with multiple breaks and single fields distributed over the grid is much more difficult.

The very real limitation to a content-based response is that the challenge does not need to be known to discover the pattern using the technique just described. If it is known, breaking the credential would happen much faster since the attacker can correlate a given response map to an exact enumerated pattern credential position. But if it is not known, or if it is too difficult or impractical to discover the challenge, then the method described will break the credential. It may take more sessions to break the credential, but it certainly can be done. It is also good to note that the data gathered in this manner is an aggregate. So any new session data that is gathered can simply be added to the current aggregate session data. This minimizes the resources needed to calculate the new aggregate and the space needed to store the data set.

Now the testing methodology for this invention will be examined. Unlike the prior enumerated pattern credential systems using a position-based challenge, the testing methodology for the in- and out-of band cases of the content-based challenge system described herein, must be separated because there are significant differences between the two.

The first case will be the in-band, secret challenge example, where the challenge characters appear in a set of fields having locations on the grid that correspond to an enumerated challenge path stored as a user credential. All of the common parameters specified previously will be assumed. For clarity, a quick explanation of an embodiment of the current invention using a secret challenge for the login operation will be given:

The location having the first position of the enumerated challenge path is a field on the grid that contains a challenge character from the character set. This character for the purposes of this example is a number. The user traverses the enumerated pattern of the enumerated pattern credential looking for the challenge character. When the challenge character in the single challenge path matches the character in a location having a numbered position in the enumerated pattern credential, the enumerated pattern credential position where the match occurs is noted. This enumerated pattern credential position is the authentication response. Any number of challenge positions can be used, but in the common parameters a 5-position challenge was specified. Having completed the first challenge-response, the user would move to the second position of the secret challenge path and perform the same operation using the challenge character found there. And then do the authentication procedure again for the challenge characters in the third, four, and fifth positions of the challenge path. Once all five responses were determined, the (in this case) response would be submitted that identifies five numbered positions on the enumerated pattern credential.

For the invention's in-band case there is not much data to analyze. The responses themselves are the enumerated pattern credential positions, which have no direct ties to the grid or the content in the grid because they do not identify locations on the grid or the characters on the grid. Nor is the challenge known since it is hidden in the grid. The only thing that an attacker can use to gather data on the system is that some location on the grid that has the enumerated pattern credential position identified in the response has the same character as the secret single challenge position on the secret challenge path. So, for example, if the first authentication response is 4, then the attacker knows that the first position of the secret challenge path and the fourth position of the enumerated pattern credential have the same character in them. However, they have no idea what the character was, or which locations were the correct positions. This makes a strategy for breaking the credential extremely difficult. The only way to do it is to start tracking all the locations on the grid. So for a given session grid with a randomized array of characters, it must be split apart into 10 separate grids that each track the location of a given character. So the first grid saved is the map of locations where the character of '1' was on the grid. The second grid saved is the map of locations where the character of '2' was on the grid, etc. Effectively, the session grid is split up into ten separate grids each corresponding to the locations of fields with the same character on the session grid. See FIG. 5 for an example. The attacker does not know which of the ten grids that is the correct grid and contains the secret challenge and the enumerated pattern credential positions. The next session involves the initial splitting of the session grid with a randomized array of characters into ten separate grids that track the locations of fields with said characters. At this point, there are ten previously stored grids and ten new grids and the attacker has no idea which of the first ten and which of the second ten contain the correct positions. It is clear that straight forward aggregation of data, like in the prior enumerated pattern credential systems, cannot work. If all the grids are added together, then there would be a positions marker in each of the fields on the grid which leaks nothing about the credential. A permutation of the first and second ten must be done to look for overlaps because the only thing that is known is that for a given identical response (the first response is 4, i.e. the first challenge position and the fourth enumerated pattern credential position have the same digital content), when the correct grids are added together, those two fields in the grid will always have the same total as the maximum number of sessions in them. For example, when there has been a total of 2 sessions those two fields will have an aggregate of 2 in them. Since the attacker has no idea which of the ten grids is the correct one, the algorithm must go through the permutations of grids by taking the first grid from the first session, and then add the first grid from the second session and save this new grid. Then the first grid from the first session is added to the second grid from the second session. And then continuing to add grids together until the last aggregate grid where the tenth grid from the first session is added to the tenth grid from the second session. Here is a partial chart to show some more of the grid permutations that must be calculated and saved:

| Grid from Session 1 + | Grid from Session 2 | New Grid to Be Saved |
|---|---|---|
| 1 | 1 | 1_1 |
| 1 | 2 | 1_2 |
| 1 | 3 | 1_3 |
| ... | ... | ... |
| 1 | 9 | 1_9 |
| 1 | 10 | 1_10 |
| ... | ... | ... |
| 5 | 1 | 5_1 |
| 5 | 2 | 5_2 |
| 5 | 3 | 5_3 |
| ... | ... | ... |
| 5 | 9 | 5_9 |

| Grid from Session 1 + | Grid from Session 2 | New Grid to Be Saved |
|---|---|---|
| 5 | 10 | 5_10 |
| ... | ... | ... |
| 10 | 1 | 10_1 |
| 10 | 2 | 10_2 |
| 10 | 3 | 10_3 |
| ... | ... | ... |
| 10 | 9 | 10_9 |
| 10 | 10 | 10_10 |

For a total of two sessions worth of data, there are now 100 grids that must be separately saved. When the third session is added, the ten grids it generates must be combined and saved separately with the 100 grids that were created by the permutations of session 1 and session 2 data. This will generate 1000 new aggregate grids. There are, of course, heuristics that can be applied to reduce the total number of grids saved. For example, if there are two sessions worth of data, any two grids added together that do not have a single 2 in a field (the position markers in the first ten have zero overlap with the position markers in the second ten) can be discarded since that combination of grids cannot contain the correct secret challenge and the enumerated pattern credential position—the correct grid combination for those positions will always contain fields in the grid that have the maximum number of session data since there will always be a marker in the relevant grid field that will be added together. To break the credential, the attacker continues to add the permutations of the grids until there is only a single grid that is saved that has two positions with the maximum number of sessions (the two positions that are being searched for). From running test programs with the specified common parameters and using the testing methodology described here, the results show that at some critical mass of aggregate sessions, the enumerated pattern credential could be exposed.

Using the two testing methodologies described, the total number of sessions to break the current invention's in-band enumerated pattern credential is on the order of twice the number of sessions needed to break the credential in the prior enumerated pattern credential systems. This is a clear and significant improvement over the prior enumerated pattern credential systems. Additionally, this art requires more resources from an attacker, both in processing power and storage, to be able to analyze the data and to be able to break the credential for this invention's secret challenge (challenge hidden in the grid) embodiment.

While the in-band case of this invention is clearly better than the prior enumerated pattern credential systems, the out-of-band case shows a huge security improvement over the prior enumerated pattern credential systems. The prior enumerated pattern credential systems in-band case is no different than the secret challenge case and could be analyzed through metrics. Analyzing the out-of-band case for this invention is more of a logical task than one of collecting data to mine. In the assumptions, we state that the attacker has no access to the out-of-band channel. This makes no difference in the prior enumerated pattern credential systems, since there is still data that can be collected. In this invention, where the response is a position on the enumerated pattern credential, there is no data to collect. All that an attacker would see is the grid with its digital content and the enumerated pattern credential position response. There is nothing to correlate the enumerated pattern credential position to anything on the grid. Since there is no data to collect, under the assumptions stated, the credential for this algorithm is impossible to break, no matter how many sessions. The only way for the enumerated pattern credential to be compromised in this art is for the out-of-band channel to be compromised. This requires much more time, effort, and resources to be able to synchronize the in- and out-of-band data first and then analyze it. And this is under the condition that the out-of-band channel has been compromised, which is an extremely difficult task to accomplish. To repeat the results for this art's out-of-band case under the common assumptions: it is not possible to break the credential.

This invention is a leap forward in security over the prior enumerated pattern credential systems; and in the case of out-of-band it is a huge leap forward. It is also clear that moving from a concrete content-based credential response to something that does not truly (physically) exist on the client side as an entity enhances user credential security that otherwise can be easily compromised by attackers.

Potential Practical Business Applicability, Repercussions, and Ramifications

This shift in authentication paradigm, especially in the out-of-band case, is beneficial in any business, either enterprise or consumer, where the security of a user's credential is paramount. Google's Analytics and Gmail services are already either mandating (Analytics) or proposing (Gmail) users to switch their accounts to a two-factor authentication system which is including a password that user remembers and a One Time Pin generated during an out-of-band mobile device-based authentication. It is a clear shift in the consumer site's adaptation of two-factor out-of-band remote user authentication. With the current development of digital wallets by key technology and business giants and initial advances in federated identity practices, by letting people with say Google or Yahoo, or Twitter, or LinkedIn accounts to enter say Facebook or eBay, points to the way that future consumer payments and other transactions having legal and financial responsibility will first of all rely on the security of out-of-band authentication protocols and algorithms. Additionally, this type of credential can be used to protect and/or authorize transactions with much more user and business assurance that the credential and the authorized transaction are safe. Truly, in any scenario where the user's credentials need to be secure, the art described in this invention is applicable.

There are many applications for a knowledge-based credential that (if used in conjunction with the out-of-band full challenge) does not leak any of the credential. Many enterprises and consumer businesses that need users to authenticate to get access to resources and/or save or process sensitive personal information rely on the security of said credential for everything. If the credential is lost, then everything in the account is compromised. One of the very common tactics that is used is to have the user reset their credentials, for the sake of an example, once every three months (this time period can be more or less depending on how much security the contents of the account necessitate). The constant credential churn creates an environment where it is extremely difficult for the user to remember their credentials, especially if there are stringent restrictions on the creation of those credentials. With this invention with the out-of-band full challenge the need for resetting credentials is gone. Users can pick, remember, and reuse indefinitely a single credential without worry of compromise.

Network Architecture, Physical Infrastructure, and User Interfaces

Figure 9:
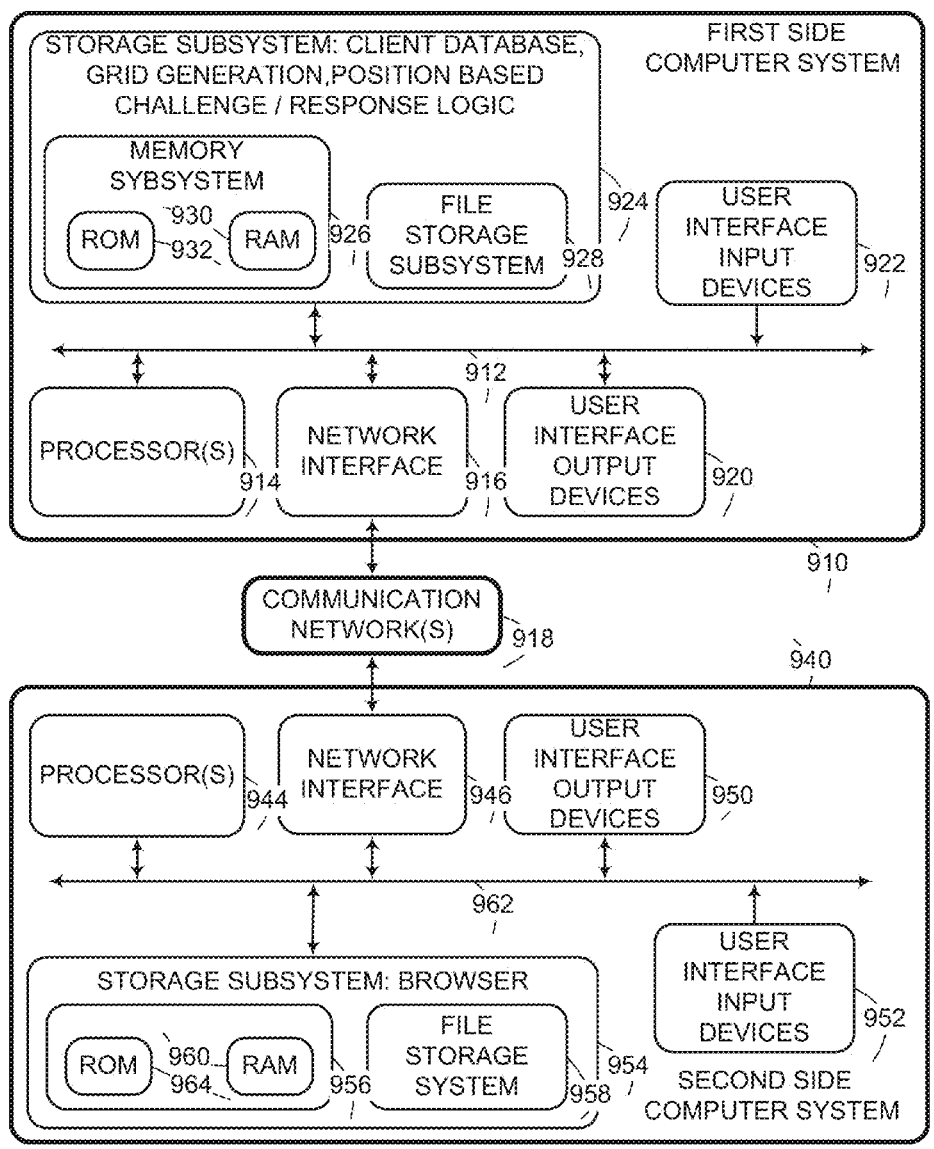
FIG. 9 is a simplified diagram of a computer implemented environment, including first and second data processing machines configured in a client-server arrangement, and including resources for authentication as described herein.

FIG. 9 is a simplified block diagram of a first computer system 910 and a second computer system 940 coupled via a communication network 918 or channel, suitable for use in authentication processes described herein. The first computer system 910 typically includes at least one processor 914 which communicates with a number of peripheral devices via bus subsystem 912. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910. Network interface subsystem 916 provides an interface to outside networks, including an interface to communication network 918, and is coupled via communication network 918 to corresponding interface devices in other computer systems. Communication network 918 may comprise many interconnected computer systems and communication links. These communication links may be wire line links, optical links, wireless links, or any other mechanisms for communication of information. While in one embodiment, communication network 918 is the Internet, in other embodiments, communication network 918 may be any suitable computer network. Likewise, the second computer system 940 typically includes at least one processor 944 which communicates with a number of peripheral devices via bus subsystem 962. These peripheral devices may include a storage subsystem 954, comprising a memory subsystem 956 and a file storage subsystem 958, user interface input devices 952, user interface output devices 950, and a network interface subsystem 946. The input and output devices allow user interaction with second computer system 940. Network interface subsystem 946 provides an interface to outside networks, including an interface to communication network 918, and is coupled via communication network 918. The second computer system 940 may be embodied by smart phones, tablet computers, laptop computers or other systems capable of executing procedures as described herein.

User interface input devices 922, 952 may include a keyboard, pointing devices such as a mouse, trackball, touchpad, or graphics tablet, a scanner, a touch-screen incorporated into the display, audio input devices such as voice recognition systems, microphones, and other types of input devices. In general, use of the term "input device" is intended to include all possible types of devices and ways to input information into computer systems 910, 940 or onto communication network 918.

User interface output devices 920, 950 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image, a video signal or an IPTV stream. The display subsystem may also provide a non-visual display such as via audio output devices. In general, use of the term "output device" is intended to include all possible types of devices and ways to output information from computer systems 910, 940 to the user or to another machine or computer system.

Storage subsystem 924 stores the basic programming and data constructs that provide the functionality of some or all of the processes described herein, including the executable instructions. These software modules are generally executed by processor(s) 914. When the programming and data constructs are combined with other resources in the computer systems 910, 940, the computer systems include logic to perform the functions described herein, on both the server and client sides.

Memory subsystems 926, 954 typically include a number of memories including a main random access memory (RAM) 930, 960 for storage of instructions and data during program execution and a read only memory (ROM) 932, 964 in which fixed instructions are stored. File storage subsystems 928, 958 provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystems 928, 958.

Bus subsystems 912, 962 provide a mechanism for letting the various components and subsystems of computer systems 910, 940 communicate with each other as intended. Although bus subsystems 912, 962 are shown schematically as a single bus, alternative embodiments of the bus subsystem may use multiple busses.

Computer systems 910, 940 can be of varying types including a personal computer, a portable computer, a workstation, a computer terminal, a network computer, a smart phone, a television, a mainframe, or any other data processing system or user device. The computer systems 910, 940 will in many embodiments be different from one another. Due to the ever-changing nature of computers and networks, the description of computer systems 910, 940 depicted in FIG. 9 is intended only as a specific example for purposes of illustrating the preferred embodiments. Many other configurations of computer systems 910, 940 are possible having more or less components than the computer system depicted in FIG. 9.

The first and second computer systems 910 and 940 are configured in this example as a client-server system including authentication resources for the enumerated pattern credential authentication and login functions using position-based response technology. The second computer system 940 can be a platform for a client subsystem including data entry devices (keyboard, mouse, voice input, etc.), a display device (CRT, LCD panel, mobile communication device, etc.), and a physical platform (personal computer, hand-held computer, internet appliance, etc.) including a processing unit, memory, and other data processing resources. Software running in the client includes a browser or a "thin" software client such as may be provided on personal digital assistants, mobile phones, and other simple Internet appliances which may not support full browser functionality. The browser can include for example a Java Virtual Machine or a .NET environment which supports the client-server dialogue. Likewise, the "thin" software client may support the client-server dialogue. Finally, an interface to the network communication media is provided. The communication media may be a private or public, local-area network or a wide-area network using wired, wireless or optical media in representative systems.

The first computer system 910 can be a platform for a server subsystem configured such as a server-configured computer, a server farm, a computer and data storage system with database capabilities and other single-site and distributed-site server-side configurations. The platform can include network server resources, an account management utility for the user accounts subject of the authentication process, and a platform including a processing unit, memory, disk space and other data processing resources. A core program supporting the authentication process is included in the server subsystem, which can be used for management of access to a protected network destination which controls access to resources such as secure web sites identified by URLs, links to secure networks, etc. The core program may be implemented using Java or .NET object-oriented technology for example. Also, a server database (or a directory service, such as LDAP) and database connector can be included. In some embodiments, the server and server data are implemented with security features to protect user account information files from intruders. A protected network destination controls access to resources such as secure web sites identified by URLs, links to secure networks, etc.

Figure 10:
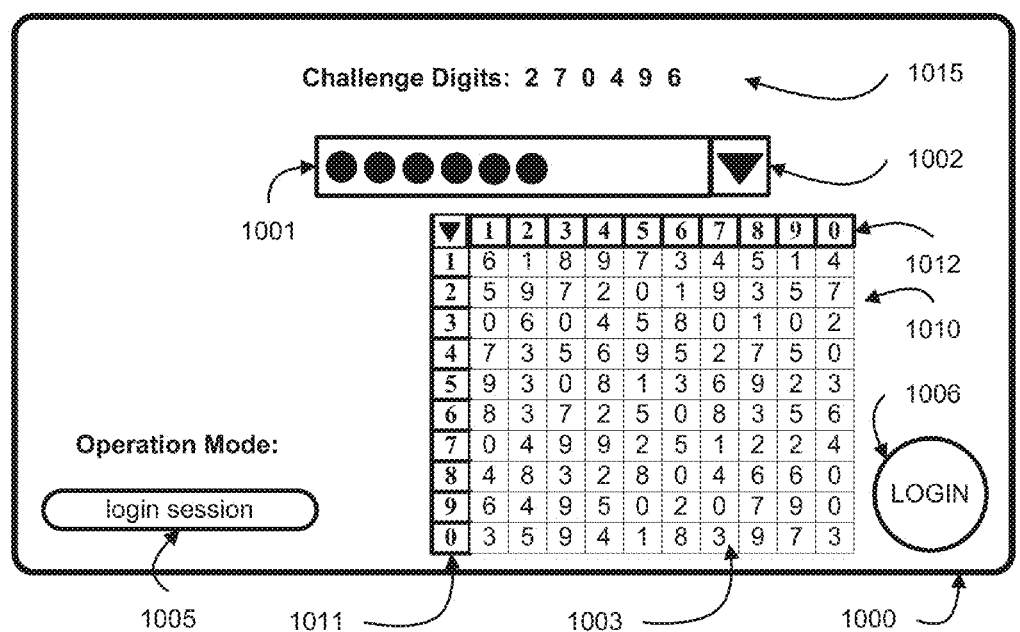
FIG. 10 is a drawing of a graphical user interface which can be used in an embodiment of an authentication system as described herein.

FIG. 10 illustrates an example of a graphical user interface screen 1000, which can be presented in an authentication session, as described herein. The graphical user interface screen 1000 can be rendered by a browser at the client platform using an electronic document expressed using a markup language with embedded scripts or links to embedded scripts, which can be delivered to the client from the server, after for example, the user identifier has been entered and accepted by the server. Alternatively, the graphical user interface screen 1000 can be rendered by programmatic code compiled into a machine executable file (for example, a C or C++ program) or programmatic code compiled into intermediary code that executes inside a virtual machine (for example, a C# or Java program). A data entry field 1001 is presented, which includes a data entry box. Also, a grid pull-down button 1002 is presented. Selection of the grid pull down button 1002 induces the system to display an instance of the grid 1010 in this example. The interface screen 1000 also includes a status field 1005 indicating the operating mode of the authentication system, and a "login" button 1006.

The instance of the grid 1010 includes an array of characters in the fields of the grid that are members of a character set consisting of the digits 0-9 in the fields having locations on the grid as discussed above. In this example, optional row and column markers 1011 and 1012 are illustrated along the right side and top side of the grid 1010, which assists the user in navigating the grid. Thus, a character at the point 1003 with coordinates (8, 0) is the character 9. The array of characters can be delivered with data defining a graphical representation of the grid from the server, can be delivered from a program executed by the client that is synchronized with a server side program, and then merged with the graphical representation delivered from the server, or can be composed by the server, or by both the server and the client, in other ways so long at the server and the client have the information needed about the array in the session-specific instance to perform the functions described here.

The interface screen 1000 in this example also displays the challenge 1015 which in this example includes the characters "2 7 0 4 9 6." Alternatively, the challenge could comprise of the members of character sets including colors, alpha numeric characters, icons or other images, audio clips, audio-visual bites, etc, which can be used to identify characters in the grid, or can be from the same character set as characters on the grid. In this example, the challenge can be embedded in the electronic document that defines the illustrated interface screen 1000, or provided by the server through a link embedded in that electronic document. In an alternative, the challenge is delivered to the client as a sequence of characters embedded at a set of locations (a challenge pattern) known to the client in said instance of the frame of reference. In this alternative, the process of generating the challenge comprises simply generating the content for the instance of the grid, and other challenge-generating logic may not be required. The length of the challenge can be smaller than, equal to, or greater than the number of fields in the enumerated pattern credential, as suits a particular embodiment. Also, the length of the challenge can change from session to session.

The grid 1010 comprises an instance of a frame of reference, such as shown in FIG. 2 or 4, where the fields having locations on the grid are populated by a randomized array of characters, selected from a character set. The character set in this example consists of the ten digits 0-9. Of course, other character sets having any practical number N1 of members may be used as suits a particular embodiment, where the character sets may include alphabetic characters, numerical characters, punctuation characters, colors, icons or other images, audio clips, audio-visual bites, and so on. In preferred systems, the grid having a number N2 of locations includes multiple instances of each character in the character set, so that any one character does not identify a single location on the grid. In the illustrated example, there are 10 instances of each of the 10 digits 0 to 9 on the 10×10 grid, where the number N1 is 10 and the number N2 is 100. Thus, this example is representative of a class of grids, where the character set consists of a number N1 of characters, and the frame of reference includes a number N2 of locations, where N2 is equal to or greater than a multiple M times N1, and the multiple M is 10 in this example. Extrapolating, the geometry of the grid does not need to be 10×10, it can be anything (e.g., 3×8 or 15×5). Nor does the total number of cells have to be 100, which means that the grid could also be 5×5.

A grid having redundant content can be defined as a grid in which any particular character in a character set can be found as an entry option in at least two random fields on a grid. So if the number of fields on the grid is N2, and the number of different characters (could be digits, or letters, etc.) is N1, then N2=M×N1, where M=2 at a minimum. As a matter of principle, this configuration could be sufficient. However, as far as the best practical security level is concerned, it is better to have M>2 (say equal to 5, or 10) so that each character can appear in the grid more than twice. This is a design tradeoff between usability, security, and GUI real estate options. Another consideration in specifying the instances of the grid involves the number of times that a particular character appears in the grid. In the purely random case, it is possible that a given character from the character set could occupy a large number of fields having locations on the grid, which might affect security. For example, consider a grid having the N2 equal to 20 arranged in a 2 by 10 grid, and using the character set of digits 0 to 9 (N1 equal to 10) and M equal to 2. An instance of the grid may have a particular digit, say digit 9, occupying any number of locations, such as 11 out of 20. This would leave the other 9 digits to the nine remaining locations. Such a case would be degenerate and unacceptable, because of the lack of redundancy on the grid of all the characters. Other degenerate cases can be found as well in a purely random case. For example, another degenerate case could occur in a 10 by 10 grid, the digit 9 might occur 91 times, and the other characters only once. So, it is preferred that each instance of the grids used have the additional characteristic that each particular character in the character set occur in the instance in at least two locations. This would require for a 10 by 10 grid with a 10 member character set, the each character occurs at least twice, and the maximum times that a particular character could occur would be 82 times. For improved security, for a 10 by 10 grid using a 10 member character set, the minimum number of times that each character occurs in the instance of the grid can be specified to be 4 or more. This type of limitation provides for a certain variation in each character redundancy but does not allow for any ridiculous extremes in that. In summary, the conditions providing certain variations in each character redundancy R and eliminating security deficient distributions of each character on the grid can be expressed as $(M-T)<=R<=(M+T)$, where R and T are security parameters with $M=>2$ and $1<=T<=(M-1)$, $(Tmin=1, Tmax=(M-1))$. Hence, the redundancy variations would depend on the value of the parameter $Tmin<=T<=Tmax$ for any given M. Two tables below show the redundancy variation range for each character on a grid with respect to M and Tmax, and M and Tmin:

TABLE 1

| M | Tmax | R |
|---|---|---|
| 10 | 9 | 1-19 |
| 5 | 4 | 1-9 |
| 2 | Tmin = Tmax = 1 | 1-3 |

In Table 1, R is calculated with expression (M−Tmax)<=R<=(M+Tmax). As can be seen, each character has a quite wide R variation, which provides rather an irregular pattern, than a random distribution. Indeed, R=1 actually means no redundancy at the minimum R range and too much redundancy for characters which happened to pick up redundancy values at the upper range. Both extreme cases which can happen for a certain subset of characters on the grid would somewhat reduce the overall security of the content distribution on the grid.

TABLE 2

| M | Tmin | R |
|---|---|---|
| 10 | 1 | 9-11 |
| 5 | 1 | 4-6 |
| 2 | Tmin = Tmax = 1 | 1-3 |

In Table 2, R is calculated with expression (M−Tmin)<=R<=(M+Tmin) which is actually (M−1)<=R<=(M+1). As can be seen, each character has a quite narrow R variation, which provides rather a random pattern of content distribution than rather irregular distributions from Table 1. Also, higher values of M lead to better overall security as R variation range becomes a great deal smaller than in Table 1 for the same values of M. The important case of M=2 is similar in both tables and it leads to a certain subset of characters not having any redundancy at all if R=1. Therefore, in order to preserve redundancy variation for each character and improve overall security of the content distribution on the grid, the condition M=>3 should be always in place, the bigger M the better for security (typically, it is a tradeoff between security and user interface footprint). If case M=2 is an important tradeoff in preserving the smallest grid size for a given set of characters, the redundancy value R=2 should be mandatory for all characters in the random content distribution, that is no R variation would be allowed in such a case.

A different instance of the array of characters can be used for each instance of the reference grid 1010. The different instances of the array of characters can be generated randomly, or pseudo-randomly, in some embodiments, with minimum constraints on redundant use of each character in the character set. Alternatively, a set of previously generated grids of characters can be utilized in random order. Other techniques can be utilized for making the presentation of the grid of indicators variable to strengthen the authentication factor. The instances of the grid can be generated at the server, and sent to the client, or they can be generated at both places using synchronized algorithms.

The user fulfills the authentication factor by providing the correct response to the challenge, where the challenge includes a sequence of challenge characters from said set of characters, where challenge characters in the sequence appear in said instance at fields having locations on the grid, and also having the numbered positions in the enumerated pattern used as a credential for the particular client. The user enters in the data entry field 1001 the responses to each challenge character, and then sends the response to the server by selecting login button 1006 in this example (or hitting an "enter" key, or otherwise). The response identifies a sequence of positions in the enumerated pattern defined by the user credential data set, by the numbers corresponding to the positions in the pattern of the locations at which the characters in the challenge appear on the instance. If the character in the challenge appears in more than one location having a position on the enumerated pattern credential or the character in the challenge does not appear at all in a position of the enumerated pattern credential, then a rule can be applied to determine the correct response.

Using this interaction between the server and the client, the server can accept input data from the client in response to the challenge, where the input data including the response identifies a sequence of positions in the enumerated pattern.

Thus, the input fields are fulfilled by inputting to the data entry field 1001 the field position numbers along the enumerated pattern credential at which the characters "2 7 0 4 9 6" appear. The input data in the data entry field 1001 are veiled by echo dots in FIG. 10 for security reasons in an attempt to reduce credential entropy leakage over a number of authentication sessions.

Figure 11:
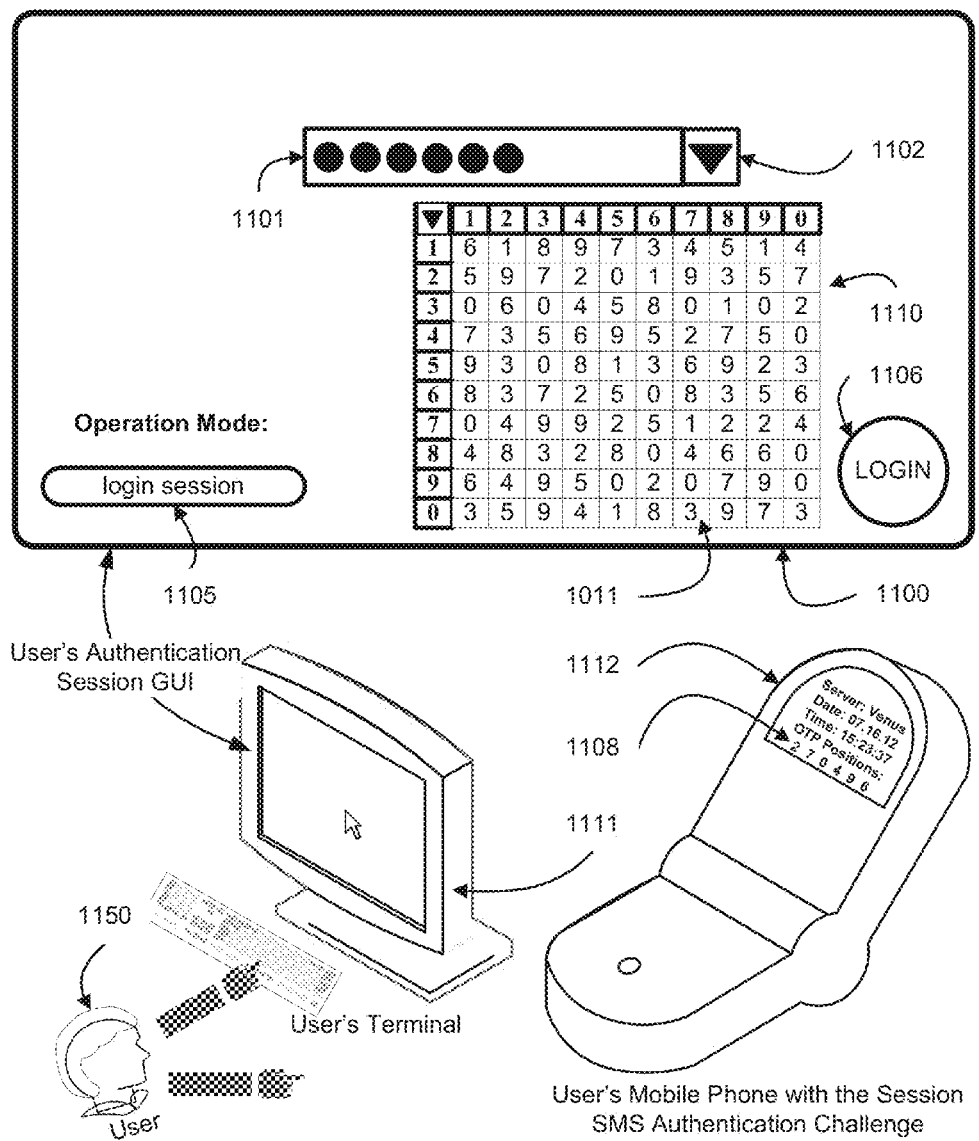
FIG. 11 is a drawing showing a graphical user interface and a two channel system, which can be used in an embodiment of an authentication system as described herein.

FIG. 11 illustrates a graphical user interface GUI 1100 rendered using a browser (as one example of a first data processing machine) for a login session in which the authentication challenge is delivered to user 1150 via a browser, email program, a Short Message Service (SMS) program or other programmatic code compiled and executed on a personal mobile communication device 1112 (as one example of a second data processing machine) rather than via the GUI on the first data processing machine, at which the user first provides a user identifier to the server. This splits the authentication challenge and response across two communication channels. The challenge in this example is generated by the server and delivered with, for example, SMS text message 1108 displayed on a user's personal mobile communication device 1112. The authentication response is generated by the user, and input to the GUI 1100 displayed using the browser or otherwise displayed on a screen of user's terminal 1111. The GUI 1100 in this example includes presentation of a data entry field 1101, which includes a data entry box. Also, a grid pull-down button 1102 is presented. Selection of the grid pull down button 1102 induces the system to display an instance of the grid 1110 in this example. The graphical user interface screen 1100 also includes a status field 1105 indicating the operating mode of the authentication system, and a "login" button 1106, like the interface of FIG. 10. In this example however, the challenge is not shown on the interface screen of the user's terminal 1111.

The instance of the grid 1010 includes digits, or other characters, in the field having locations on the grid as discussed above. In this example, optional row and column markers 1011 and 1012 are illustrated along the right side and top side of the grid 1010, which assists the user in navigating the grid. Thus, a character at the point 1003 with coordinates (8, 0) is the digit 9.

The out-of-band challenge case illustrated by the example shown in FIG. 11 is not limited to a challenge going to the mobile device with a grid in the browser. The grid can go to a mobile device or an email application, while the challenge stay with the browser, the grid can go to the mobile device and the challenge can go to the email application, while the authentication response is entered into the browser. Authentication systems can deploy other two channel configurations, where one of the channels is "out-of-band" relative to the other.

Figure 12:
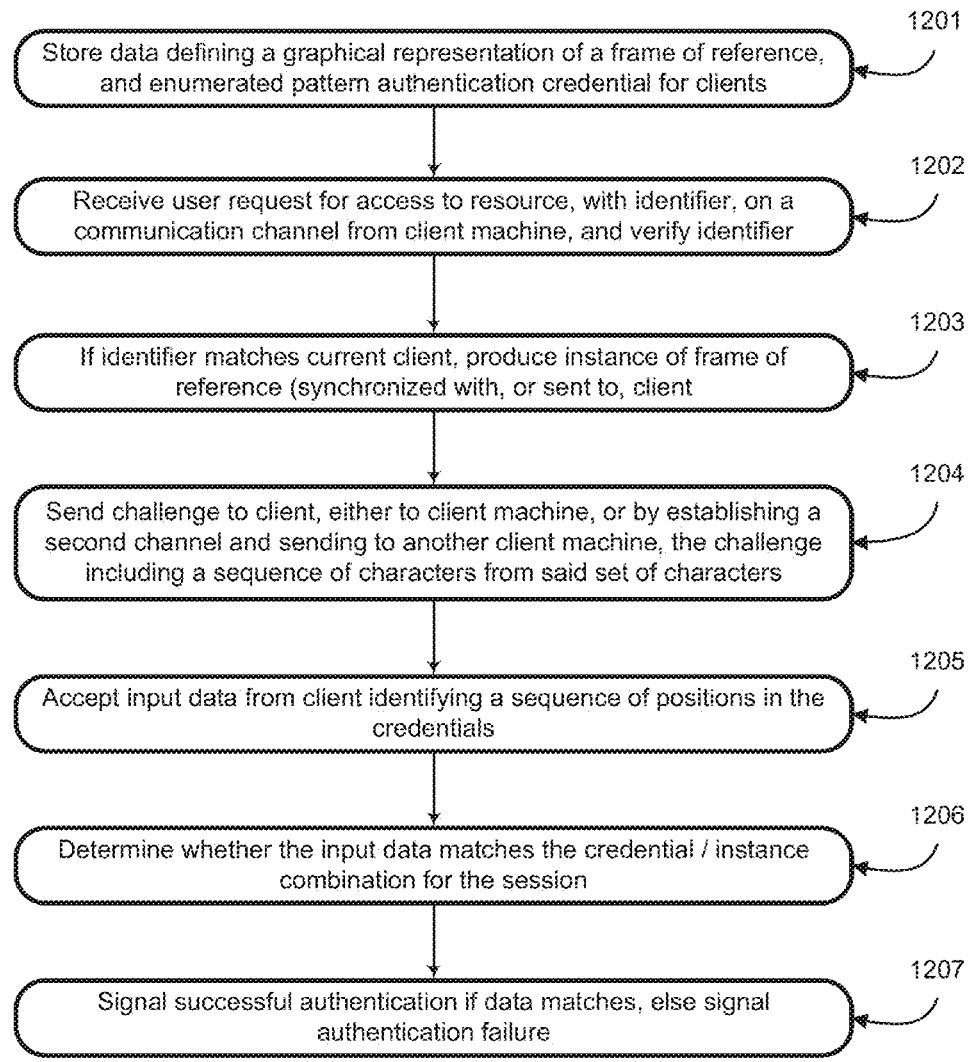
FIG. 12 is a flow chart of server-side logic for embodiments of the authentication system as described herein.

FIG. 12 illustrates server side functions for an enumerated pattern credential-based authentication system as described herein. From the server-side, the method includes storing data defining a graphical representation of a frame of reference adapted for rendering on the display, such as the grids illustrated above (1201). Such data defining a graphical representation can consist of an implicit definition that is based on the logic used to produce instances of the frame of reference, or an explicit definition that can comprise a markup language description of a graphical object that can contain or be merged with an array of characters to be used in authentication sessions. The frame of reference includes locations in the frame of reference having coordinates on the frame of reference, such as the fields at the identified rows and columns of the grid. A session can be begun upon receiving a user request for access to a resource for example, which carries an identifier of the user, on a communication channel from a client machine, and verifying the user identifier (1202). If the user identifier matches a current client, then a session-specific instance of a frame of reference is presented to the client for the current session (1203). This instance of the frame of reference, including a randomized array of characters, can be generated using an algorithm that is synchronized with a corresponding algorithm executed by a client machine, or it can be generated on the server side, and sent to the client as discussed above. The instance the instance includes characters positioned in the number N of pre-defined fields according to a pattern different than used in other authentication sessions with the client, the characters consisting of members of a character set including M members, where N is greater than 2M. The session-specific instance of a frame of reference is presented to the client using data communications that can be implemented in a variety of configurations, as described above. For example, the session-specific instance can be presented to the client by a data communication sending an electronic document executable by the client to render said instance. Also, the session-specific instance can be presented to the client by a data communication sending a graphical representation of the frame of reference, which is populated at the client using client-side program synchronized with a complementary server side program, as mentioned above. Also, the data communications can be performed using one, two or more communication channels.

Next, a challenge is used by the client (1204). The challenge consists of a sequence of characters taken from the set of characters that populates the instance of the frame of reference, which match characters in the fields at a session-specific subset of the locations along the enumerated pattern, whereby the position numbers of said session-specific subset comprise an authentication response for the instance. There is a variety of ways in which the client can obtain the challenge. The challenge can be sent to the client, either directly to the client machine from which the user request was received, or alternatively by establishing a second communication channel and then sending it to another client machine such as a process on a mobile device, as discussed above. Also, the challenge can be embedded in an instance of the frame of reference received from the server, or produced by the client using a process synchronized with a complementary process executed by the server, as described with reference to FIGS. 3 and 4, or can be sent as a separate message or sequence of messages to the client embedded in an electronic document used to render a graphical user interface, or by a separate communication to another device as mentioned above. In some embodiments, the credential for a client includes a second shared secret comprising data identifying a second enumerated pattern of fields on a frame of reference, the fields in the second enumerated pattern having locations in the frame of reference and the locations have numbered positions in the second enumerated pattern. The challenge can comprise characters in the fields on the session-specific instance that are on the second enumerated pattern.

As a next step from the server-side, input data is accepted from the client that identifies a sequence of numbered positions in the enumerated pattern (1205). The server-side resources then determine whether the input data matches the credential/instance combination for the current session (1206). Next, a successful authentication is signaled if the data matches, enabling the process to proceed to a next tier of authentication, or to provide access to the requested resource as suits a particular implementation. If the data does not match, then an authentication failure can be signaled (1207).

For embodiments in which the client has access to a first data processing machine, such as a browser being executed on a laptop or desktop computer, and a second data processing machine such as a browser, e-mail account, SMS text message account or other program being executed on a second platform, such as a mobile phone or the like, the server side resources can include logic to establish a first communication channel including connection between the server-side computer and the first data processing machine, to receive input including the client identifier from the first data processing machine via one or more data communications on the first communication channel; to verify the client identifier received via the first communication channel, and to establish a second communication channel, including a connection between the server-side computer and the second data processing machine, and after verifying the client identifier, sending the challenge to the second data processing machine via communications on the second communication channel. In this two-channel embodiment, the server-side resources can include logic to accept the input data in response to the challenge from the first data processing machine via the first communication channel. In embodiments wherein said data set includes a second shared secret comprising data identifying a second enumerated pattern of fields on a frame of reference, the fields in the second enumerated pattern having locations in the frame of reference and the locations having numbered positions in the second enumerated pattern, and the process can include using a second instance of the frame of reference having characters positioned in the number N of pre-defined fields according to a pattern different than used in said first mentioned instance, wherein said challenge characters include characters in at least a subset of the fields of the second enumerated pattern on the second instance. This second instance can be presented on the second data processing machine.

The functions described with reference to FIG. 12 can be implemented by a computer program or programs stored in the server storage system that, upon execution by the server-side data processing machine, implement corresponding logic. Likewise, a computer program or programs can be stored in a non-transitory machine-readable data storage medium, or other computer memory.

From the client side, complementary functions are executed. Such functions can in some embodiments include displaying a graphical user interface by rendering an electronic document delivered from the server. The graphical user interface can display the session instance of the frame of reference, and optionally display the challenge, as discussed above. The graphical user interface can be rendered by executing the electronic document, including any scripts embedded in the document or to which links are provided in the document, using a browser and any supporting technology on the client side as necessary. An electronic document used to deliver the session instance of the frame of reference, can include the challenge embedded therein, either directly in the document or via links included in the document. In some embodiments, the client-side resources include an algorithm, implemented by client-side software such as scripts provided to the client via the server during a client set-up procedure, that can be synchronized with the server-side resources to generate the per-session instance of the frame of reference in a manner that is synchronized.

Thus a client side method for identification and verification of a user at a client platform in a client/server, computer-networking system that implements an authentication server is described. The method uses an authentication credential as a shared secret with the authentication server. The authentication credential comprises an enumerated pattern of fields on a frame of reference, the fields in the enumerated pattern having locations on the frame of reference and numbered positions in the enumerated pattern. A client seeking authentication can perform the following procedure:

using a data processing machine or data processing machines, establishing one or more communication channels to the authentication server, and sending a user identifier via said one or more communication channels to the authentication server, receiving a session specific instance of the frame of reference as a result of successful identification of the user identifier by the authentication server, from the authentication server, from an application synchronized with a function used to produce an instance at the authentication server or from a combination of the authentication server and an application, the session-specific instance of the frame of reference having fields filled with a session-specific content, wherein the session-specific content comprises characters that are members of a set of characters;

rendering an interface on a display including a graphical representation of the session-specific instance of the frame of reference;

using an authentication challenge including a plurality of challenge characters from said set of characters, to determine a subset of session-specific numbered positions in the enumerated pattern of fields at which said plurality of challenge characters match the challenge characters in said session-specific instance of the frame of reference;

sending authentication response data via said one or more communication channels to the authentication server, the response data identifying said session-specific numbered positions in the enumerated pattern, said session specific numbered positions being usable by the authentication server as part of a verification process; and receiving a signal via said one or more communication channels from the authentication server that indicates completion of the verification process.

In embodiments in which wherein the authentication credential comprises a second data set identifying a second enumerated pattern of fields on a frame of reference, the fields in the second enumerated pattern having locations in the frame of reference and numbered positions in the second enumerated pattern, and the challenge characters of the authentication challenge can disposed in at least a subset of the locations in the second enumerated pattern in said session-specific instance of the frame of reference. Also, in some embodiments, the client can receive a second session specific instance of the frame of reference on the second data processing machine from the authentication server, from a local application synchronized with a function used to produce an instance at the authentication server or from a combination of the authentication server and a local application, the second session-specific instance of the frame of reference having fields filled with a session-specific content, wherein the session-specific content comprises characters that are members of a set of characters.

Also, in embodiment in which for a given session-specific instance of the frame of reference, if there are no locations in the enumerated pattern that include a character matching one of the challenge characters, then the client can apply a designated rule to determine a character to include in the response data.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for identification and verification of a user at a client platform in a client/server, computer-networking system that implements an authentication server, the method using an authentication credential as a shared secret with the authentication server, the authentication credential comprising a data set identifying an enumerated pattern of fields on a frame of reference, the fields in the enumerated pattern having locations on the frame of reference and numbered positions in the enumerated pattern; the method comprising:

using a data processing machine or data processing machines, establishing one or more communication channels to the authentication server, and sending a user identifier via said one or more communication channels to the authentication server;

receiving a session specific instance of the frame of reference as a result of successful identification of the user identifier by the authentication server, from the authentication server, from an application synchronized with a logical function used to produce an instance at the authentication server or from a combination of the authentication server and an application, the session-specific instance of the frame of reference having fields filled with a session-specific content, wherein the session-specific content comprises characters that are members of a set of characters;

rendering an interface on a display including a graphical representation of the session-specific instance of the frame of reference;

using an authentication challenge including a plurality of challenge characters from said set of characters, to determine a subset of session-specific numbered positions in the enumerated pattern of fields at which said plurality of challenge characters match the characters in said session-specific instance of the frame of reference;

sending authentication response data via said one or more communication channels to the authentication server, the response data identifying said session-specific numbered positions in the enumerated pattern, said session specific numbered positions being usable by the authentication server as part of a verification process; and receiving a signal via said one or more communication channels from the authentication server that indicates completion of the verification process.

2. The method of claim 1, wherein the authentication credential comprises a second data set identifying a second enumerated pattern of fields on a frame of reference, the fields in the second enumerated pattern having locations in the frame of reference and numbered positions in the second enumerated pattern, and wherein the challenge characters of the authentication challenge are disposed in at least a subset of the locations in the second enumerated pattern in said session-specific instance of the frame of reference.

3. The method of claim 1, including rendering the interface using a first data processing machine, and receiving the authentication challenge at a second data processing machine.

4. The method of claim 3, wherein the authentication credential comprises a second data set identifying a second enumerated pattern of fields on a frame of reference, the fields in the second enumerated pattern having locations in the frame of reference and numbered positions in the second enumerated pattern, and including:

receiving a second session-specific instance of the frame of reference on the second data processing machine from the authentication server, from a local application synchronized with a logical function used to produce an instance at the authentication server or from a combination of the authentication server and a local application, the second session-specific instance of the frame of reference having fields filled with a session-specific content, wherein the session-specific content comprises characters that are members of a set of characters;

wherein the challenge characters of the authentication challenge are disposed in at least a subset of the locations in the second enumerated pattern in said second session-specific instance of the frame of reference.

5. The method of claim 1, wherein the set of characters consists of a number N1 of characters, and the session-specific instance of the frame of reference includes a number N2 of locations populated by characters from the set of characters, where N2 is equal to or greater than a multiple M times N1, and the multiple M is at least 2.

6. The method of claim 1, wherein the set of characters consists of a number of characters, and each character in the set of characters is included in at least two fields having locations on the session-specific instance of the frame of reference.

7. The method of claim 1, wherein for a given session-specific instance of the frame of reference, if there are no locations in the enumerated pattern that include a character matching one of the challenge characters, then apply a rule to determine a character to include in the response data.

8. An interactive method for authentication of a client, comprising:

storing data defining a graphical representation of a frame of reference adapted for rendering on a display, the frame of reference including a number N of pre-defined fields having locations on the frame of reference;

storing a data set associated with the client in a memory, the data set including a shared secret, the shared secret comprising data identifying an enumerated pattern of fields on a frame of reference, the fields in the enumerated pattern having locations on the frame of reference and the locations having numbered positions in the enumerated pattern;

receiving via data communications, a client identifier from the client and initiating a request for use in an authentication session;

presenting using data communications, to the client an instance of the graphical representation of the frame of reference in response to the request for use in the authentication session, the instance including characters in the number N of pre-defined fields according to a pattern different than used in other authentication sessions with the client, the characters consisting of members of a character set including M members, where N is greater than or equal to 2M, and using challenge characters known or delivered to the client via data communications, which match characters in the fields at a session-specific subset of the locations along the enumerated pattern, whereby the position numbers of said session-specific subset comprise an authentication response for the instance;

accepting input data from the client via data communications, the input data including said authentication response entered by the client using an input device; and determining whether the input data matches the authentication response, and if the input data matches, signaling successful authentication, and if the input data does not match, signaling failed authentication.

9. The method of claim 8, wherein said data set includes a second shared secret comprising data identifying a second enumerated pattern of fields on a frame of reference, the fields in the second enumerated pattern having locations in the frame of reference and the locations having numbered positions in the second enumerated pattern, and wherein said challenge characters include characters in at least a subset of the fields of the second enumerated pattern.

10. The method of claim 8, including presenting to the client an instance of the graphical representation of the frame of reference by sending an electronic document executable by the client to render said instance.

11. The method of claim 8, wherein the client positions the characters in the instance of the graphical representation, using a program executed by the client.

12. The method of claim 8, wherein the set of characters consists of a number of characters, and each character in the set of characters is included in at least two fields having locations on the session-specific instance of the frame of reference.

13. The method of claim 8, wherein for a given session-specific instance of the frame of reference, if there are no locations in the enumerated pattern that include a character matching one of the challenge characters, then apply a rule which can be applied by the client, to determine a character to include in the authentication response.

14. The method of claim 8, including presenting to the client an instance of the graphical representation of the frame of reference using a first communication medium, and sending the challenge to the client using a different communication medium.

15. The method of claim 8, including presenting to the client an instance of the graphical representation of the frame of reference by sending to the client an electronic document executable by the client to render said instance, wherein said sending to the client a challenge includes sending the challenge to the client embedded in said electronic document.

16. The method of claim 8, wherein said client has access to a first data processing machine and to a second data processing machine, and including:

establishing a first communication channel including a connection between a computer and the first data processing machine;

receiving an input client identifier from the first data processing machine via one or more data communications on the first communication channel;

verifying the input client identifier; and establishing a second communication channel including a connection between the computer and the second data processing machine; and after said verifying, presenting said to challenge to the second data processing machine using one or more data communications on the second communication channel.

17. The method of claim 16, wherein said data set includes a second shared secret comprising data identifying a second enumerated pattern of fields on a frame of reference, the fields in the second enumerated pattern having locations in the frame of reference and the locations having numbered positions in the second enumerated pattern, and including:

using a second instance of the frame of reference having characters positioned in the number N of pre-defined fields according to a pattern different than used in said first mentioned instance, wherein said challenge characters include characters in at least a subset of the fields of the second enumerated pattern on the second instance.

18. The method of claim 17, including:

accepting said input data in response to the challenge from the first data processing machine via one or more data communications on the first communication channel.

19. The method of claim 17, wherein said first data processing machine comprises a first application executed on a first processor having an interface to a physical communication medium, and the second data processing machine comprises a second application executed on a second processor different than the first processor, and having an interface to a different physical communication medium.

20. An interactive method for authentication of a client, comprising:

storing data defining a graphical representation of a frame of reference adapted for rendering on a display, the frame of reference including a number N of pre-defined fields in the frame of reference having locations on the frame of reference;

storing a data set associated with the client in a memory, the data set including a first shared secret and a second shared secret, the first shared secret comprising data identifying a first enumerated pattern of fields on a frame of reference, the fields in the first enumerated pattern having locations in the frame of reference and the locations have numbered positions in the first enumerated pattern, and the second shared secret comprising data identifying a second enumerated pattern of fields on a frame of reference, the fields in the second enumerated pattern having locations in the frame of reference and the locations have numbered positions in the second enumerated pattern;

receiving via a first data communication, a client identifier from the client and initiating a request for use in an authentication session;

presenting via a second data communication, to the client an instance of the graphical representation of the frame of reference in response to the request for use in the authentication session, the instance including characters positioned in the number N of pre-defined fields according to a pattern different than used in other authentication sessions with the client, the characters consisting of members of a character set including M members, where N is greater than or equal to 2M, and in which characters in the fields of the second enumerated pattern comprise challenge characters which match characters in the fields at a session-specific subset of the locations along the first enumerated pattern, whereby the position numbers of said session-specific subset comprise an authentication response for the instance;

accepting input data from the client via a third data communication, the input data including said authentication response entered by the client using an input device; and determining whether the input data matches the authentication response, and if the input data matches, signaling successful authentication, and if the input data does not match, signaling failed authentication.

21. A client-server authentication system to authenticate a client, comprising:

data processing resources, including one or more processors, memory and a communication interface;

data stored in said memory defining a graphical representation of a frame of reference adapted for rendering on a display, the frame of reference including a number N of pre-defined fields in the frame of reference having locations on the frame of reference, and including data including authentication credentials for clients, the authentication credential for a particular client comprising a data set identifying a first enumerated pattern of fields on a frame of reference, the fields in the first enumerated pattern having locations in the frame of reference and the locations have numbered positions in the first enumerated pattern;

the data processing resources including executable instructions stored in said memory adapted for execution by the processor, including logic to receive via data communications, a client identifier from the client and initiating a request for use in an authentication session;

present using data communications, to the client an instance of the graphical representation of the frame of reference in response to the request for use in the authentication session, the instance including characters positioned in the number N of pre-defined fields according to a pattern different than used in other authentication sessions with the client, the characters consisting of members of a character set including M members, where N is greater than or equal to 2M, and to use challenge characters known or delivered to the client via data communications, which match characters in the fields at a session-specific subset of the locations along the enumerated pattern, whereby the position numbers of said session-specific subset comprise an authentication response for the instance;

accept input data from the client via data communications, the input data including said authentication response entered by the client using an input device; and determine whether the input data matches the authentication response, and if the input data matches, to signal successful authentication, and if the input data does not match, to signal failed authentication.

22. The system of claim 21, wherein said data set includes a second shared secret comprising data identifying a second enumerated pattern of fields on a frame of reference, the fields in the second enumerated pattern having locations in the frame of reference and the locations having numbered positions in the second enumerated pattern, and wherein said challenge characters include characters in at least a subset of the fields of the second enumerated pattern.

23. The system of claim 21, including logic to present to the client an instance of the graphical representation of the frame of reference by sending an electronic document executable by the client to render said instance.

24. The system of claim 21, wherein the client positions the characters in the instance of the graphical representation, using a program executed by the client.

25. The system of claim 21, wherein the set of characters consists of a number of characters, and each character in the set of characters is included in at least two fields having locations on the session-specific instance of the frame of reference.

26. The system of claim 21, wherein for a given session-specific instance of the frame of reference, if there are no locations in the enumerated pattern that include a character matching one of the challenge characters, then the logic applies a rule which can be applied by the client, to determine a character to include in the authentication response.

27. The system of claim 21, including logic to present to the client an instance of the graphical representation of the frame of reference using a first communication medium, and to send the challenge to the client using a different communication medium.

28. The system of claim 21, including logic to present to the client an instance of the graphical representation of the frame of reference by sending to the client an electronic document executable by the client to render said instance, wherein said logic to send to the client a challenge includes sending the challenge to the client embedded in said electronic document.

29. The system of claim 21, wherein said client has access to a first data processing machine and to a second data processing machine, and including logic to:
  establish a first communication channel including a connection between a computer and the first data processing machine;
  receive an input client identifier from the first data processing machine via one or more data communications on the first communication channel;
  verify the input client identifier; and
  establish a second communication channel including a connection between the computer and the second data processing machine; and after said verifying, to present said challenge to the second data processing machine using one or more data communications on the second communication channel.

30. The system of claim 29, wherein said data set includes a second shared secret comprising data identifying a second enumerated pattern of fields on a frame of reference, the fields in the second enumerated pattern having locations in the frame of reference and the locations having numbered positions in the second enumerated pattern, and including logic to:
  use a second instance of the frame of reference having characters positioned in the number N of pre-defined fields according to a pattern different than used in said first mentioned instance, wherein said challenge characters include characters in at least a subset of the fields of the second enumerated pattern on the second instance.

31. The system of claim 30, including logic to:
  accept said input data in response to the challenge from the first data processing machine via one or more data communications on the first communication channel.

32. The system of claim 29, wherein said first data processing machine comprises a first application executed on a first processor having an interface to a physical communication medium, and the second data processing machine comprises a second application executed on a second processor different than the first processor, and having an interface to a different physical communication medium.

33. A computer program stored on a non-transitory computer readable medium and executable by a computer to authenticate a client, comprising instructions to:
  use data stored in a memory defining a graphical representation of a frame of reference adapted for rendering on a display, the frame of reference including a number N of pre-defined fields in the frame of reference having locations on the frame of reference, and including data including authentication credentials for clients, the authentication credential for a particular client comprising a data set identifying a first enumerated pattern of fields on a frame of reference, the fields in the first enumerated pattern having locations in the frame of reference and the locations have numbered positions in the first enumerated pattern;
  receive via data communications, a client identifier from the client and initiating a request for use in an authentication session;
  present using data communications, to the client an instance of the graphical representation of the frame of reference in response to the request for use in the authentication session, the instance including characters positioned in the number N of pre-defined fields according to a pattern different than used in other authentication sessions with the client, the characters consisting of members of a character set including M members, where N is greater than or equal to 2M, and
  to use challenge characters known or delivered to the client via data communications, which match characters in the fields at a session-specific subset of the locations along the enumerated pattern, whereby the position numbers of said session-specific subset comprise an authentication response for the instance;
  accept input data from the client via data communications, the input data including said authentication response entered by the client using an input device; and
  determine whether the input data matches the authentication response, and if the input data matches, to signal successful authentication, and if the input data does not match, to signal failed authentication.

34. The program of claim 33, wherein said data set includes a second shared secret comprising data identifying a second enumerated pattern of fields on a frame of reference, the fields in the second enumerated pattern having locations in the frame of reference and the locations having numbered positions in the second enumerated pattern, and wherein said challenge characters include characters in at least a subset of the fields of the second enumerated pattern.

35. The program of claim 33, including logic to present to the client an instance of the graphical representation of the frame of reference by sending an electronic document executable by the client to render said instance.

36. The program of claim 33, wherein the client positions the characters in the instance of the graphical representation, using a program executed by the client.

37. The program of claim 33, wherein the set of characters consists of a number of characters, and each character in the set of characters is included in at least two fields having locations on the session-specific instance of the frame of reference.

38. The program of claim 33, wherein for a given session-specific instance of the frame of reference, if there are no locations in the enumerated pattern that include a character matching one of the challenge characters, then the logic applies a rule which can be applied by the client, to determine a character to include in the authentication response.

39. The program of claim 33, including logic to present to the client an instance of the graphical representation of the frame of reference using a first communication medium, and to send the challenge to the client using a different communication medium.

40. The program of claim 33, including logic to present to the client an instance of the graphical representation of the frame of reference by sending to the client an electronic document executable by the client to render said instance, wherein said logic to send to the client a challenge includes sending the challenge to the client embedded in said electronic document.

41. The program of claim 33, wherein said client has access to a first data processing machine and to a second data processing machine, and including logic to:
   establish a first communication channel including a connection between a computer and the first data processing machine;
   receive an input client identifier from the first data processing machine via one or more data communications on the first communication channel;
   verify the input client identifier; and
   establish a second communication channel including a connection between the computer and the second data processing machine; and after said verifying, to present said challenge to the second data processing machine using one or more data communications on the second communication channel.

42. The program of claim 41, wherein said data set includes a second shared secret comprising data identifying a second enumerated pattern of fields on a frame of reference, the fields in the second enumerated pattern having locations in the frame of reference and the locations having numbered positions in the second enumerated pattern, and including logic to:
   use a second instance of the frame of reference having characters positioned in the number N of pre-defined fields according to a pattern different than used in said first mentioned instance, wherein said challenge characters include characters in at least a subset of the fields of the second enumerated pattern on the second instance.

43. The program of claim 42, including logic to:
   accept said input data in response to the challenge from the first data processing machine via one or more data communications on the first communication channel.

44. The program of claim 41, wherein said first data processing machine comprises a first application executed on a first processor having an interface to a physical communication medium, and the second data processing machine comprises a second application executed on a second processor different than the first processor, and having an interface to a different physical communication medium.

* * * * *